(12) United States Patent
Pietz et al.

(10) Patent No.: US 12,277,518 B2
(45) Date of Patent: Apr. 15, 2025

(54) MODULAR SYSTEM FOR FOOD ASSEMBLY

(71) Applicant: Hyphen Technologies, Inc., San Jose, CA (US)

(72) Inventors: Derek Pietz, Oakland, CA (US); Abram Simon, Oakland, CA (US); Stephen Klein, Oakland, CA (US); Daniel Fukuba, Oakland, CA (US)

(73) Assignee: Hyphen Technologies, Inc., San Jose, CA (US)

( * ) Notice: Subject to any disclaimer, the term of this patent is extended or adjusted under 35 U.S.C. 154(b) by 696 days.

(21) Appl. No.: 17/494,743

(22) Filed: Oct. 5, 2021

(65) Prior Publication Data

US 2022/0104661 A1 Apr. 7, 2022

Related U.S. Application Data

(60) Provisional application No. 63/087,662, filed on Oct. 5, 2020.

(51) Int. Cl.
| | |
|---|---|
| *G06Q 10/0631* | (2023.01) |
| *A23L 5/10* | (2016.01) |
| *A47J 44/00* | (2006.01) |
| *B65G 37/00* | (2006.01) |

(Continued)

(52) U.S. Cl.
CPC .......... *G06Q 10/06316* (2013.01); *A23L 5/10* (2016.08); *A47J 44/00* (2013.01); *B65G 37/005* (2013.01); *G05B 19/041* (2013.01); *G06Q 10/06311* (2013.01); *H04L 67/12* (2013.01); *A47J 2201/00* (2013.01)

(58) Field of Classification Search
CPC ... A23L 5/00; A23L 5/10; A47J 44/00; G06Q 10/06311; G06Q 10/06316; G05B 19/041; G05B 2219/2645
See application file for complete search history.

(56) References Cited

U.S. PATENT DOCUMENTS

| | | | | |
|---|---|---|---|---|
| 5,389,764 A | * | 2/1995 | Nishii | H05B 6/645 |
| | | | | 219/508 |
| 2005/0193901 A1 | * | 9/2005 | Buehler | A23L 5/10 |
| | | | | 99/468 |

(Continued)

*Primary Examiner* — Thien S Tran
(74) *Attorney, Agent, or Firm* — Run8 Patent Group, LLC; Peter Miller; Leah Raddatz

(57) ABSTRACT

One variation of a food production station includes: a manual assembly zone; an autonomous assembly zone; and a controller. The manual assembly zone includes: a prep surface; and a receptacle configured to receive a sequence of food hoppers configured to store ingredients for manual preparation of food products on the prep surface. The autonomous assembly zone includes: a sequence of module housings supporting the prep surface and configured to house a sequence of food dispensing modules configured to dispense ingredients into food containers; and a conveyor located within the sequence of module housings and configured to transfer food containers along the sequence of food dispensing modules for dispensation of ingredients into food containers. The controller is configured to: receive food orders; and coordinate motion of the conveyor and trigger the sequence of food dispensing modules to dispense ingredients into food containers to assemble food products according to food orders.

20 Claims, 13 Drawing Sheets

(51) Int. Cl.
*G05B 19/04* (2006.01)
*H04L 67/12* (2022.01)

(56) References Cited

U.S. PATENT DOCUMENTS

| | | | | |
|---|---|---|---|---|
| 2011/0208355 | A1* | 8/2011 | Tsusaka | B25J 13/08 901/31 |
| 2015/0290795 | A1* | 10/2015 | Oleynik | B25J 9/0081 700/257 |
| 2016/0213053 | A1* | 7/2016 | Frehn | A23L 5/10 |
| 2019/0176338 | A1* | 6/2019 | Zito | G06Q 50/12 |
| 2019/0352028 | A1* | 11/2019 | Mirkhaef | B65B 11/02 |
| 2020/0030966 | A1* | 1/2020 | Hasegawa | B25J 9/0087 |
| 2020/0087069 | A1* | 3/2020 | Johnson | B25J 9/161 |
| 2020/0121125 | A1* | 4/2020 | Zito | A47J 37/12 |
| 2021/0094188 | A1* | 4/2021 | Rodionov | B25J 11/0045 |
| 2021/0387363 | A1* | 12/2021 | Watanabe | F16P 3/006 |

* cited by examiner

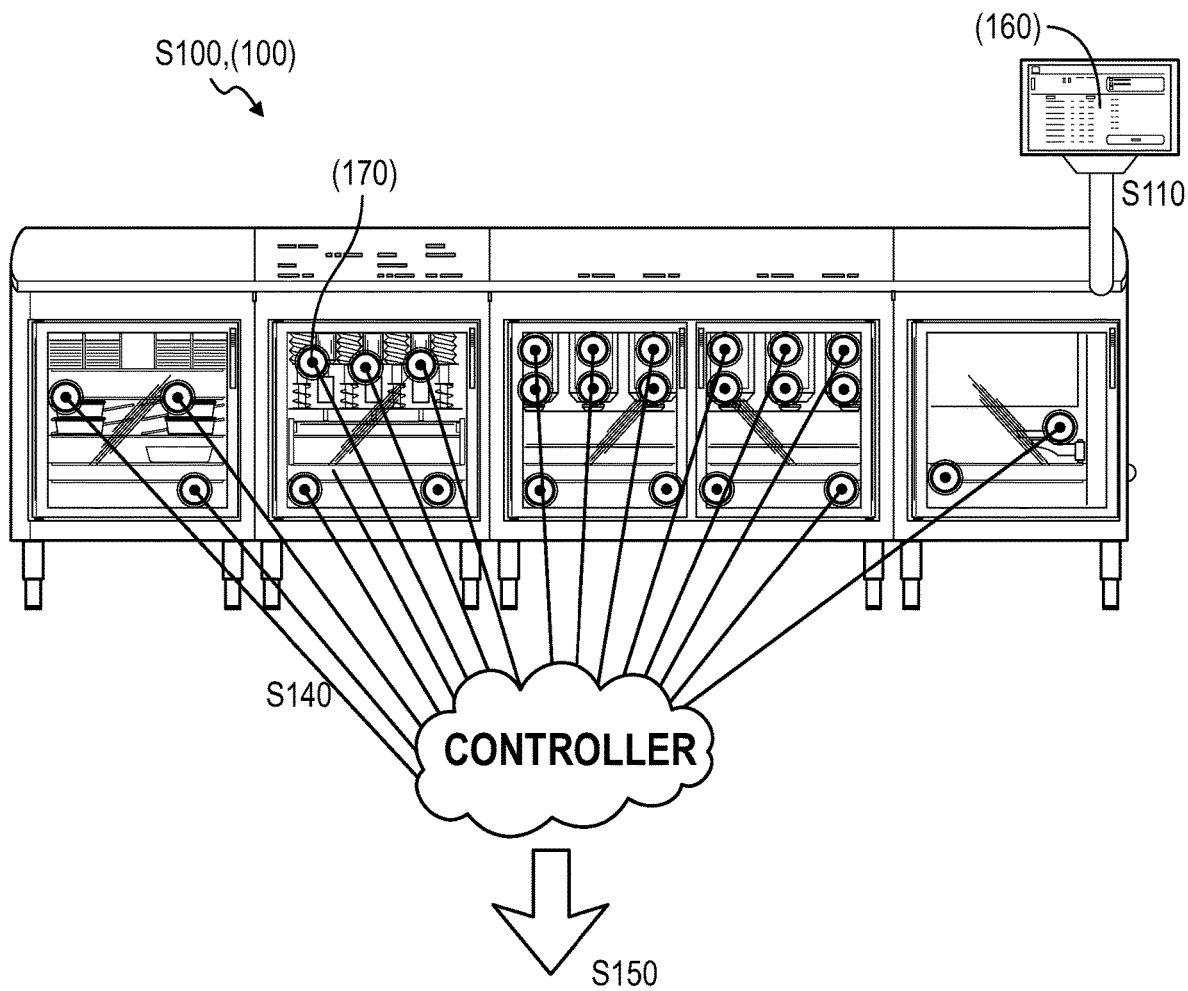

| TIMESTAMP | ORDER# | ASSEMBLY | LOCATION | DISPENSED | DISPENSED AMOUNT |
|---|---|---|---|---|---|
| 12:08:44 | 122 | AUTO | QUEUE | N/A | N/A |
| 12:08:46 | 125 | MANUAL | QUEUE | N/A | N/A |
| 12:11:10 | 122 | AUTO | HOUSING 1 | CONTAINER | SMALL BOWL |
| 12:11:20 | 122 | AUTO | HOUSING 2 | LETTUCE | 2.50 OUNCES |
| 12:11:24 | 122 | AUTO | HOUSING 3 | CHICKEN | 2.50 OUNCES |
| 12:11:25 | 125 | MANUAL | MANUAL ZONE | CONTAINER | LARGE BOWL |
| 12:11:30 | 122 | AUTO | HOUSING 3 | PEPPERS | 3.00 OUNCES |
| 12:11:33 | 125 | MANUAL | MANUAL ZONE | RICE | 4.10 OUNCES |
| 12:11:37 | 125 | MANUAL | MANUAL ZONE | LETTUCE | 2.52 OUNCES |
| 12:11:41 | 122 | AUTO | HOUSING 3 | CORN | 4.00 OUNCES |
| 12:11:45 | 125 | MANUAL | MANUAL ZONE | CORN | 2.60 OUNCES |
| 12:11:50 | 122 | AUTO | HOUSING 4 | LID | SMALL BOWL LID |
| 12:11:50 | 125 | MANUAL | MANUAL ZONE | PEPPERS | 3.20 OUNCES |
| 12:11:54 | 122 | AUTO | ELEVATOR | N/A | N/A |
| 12:11:58 | 125 | MANUAL | MANUAL ZONE | ONION | 2.55 OUNCES |
| 12:12:07 | 125 | MANUAL | MANUAL ZONE | LID | LARGE BOWL LID |

*FIG. 7*

MODULAR SYSTEM FOR FOOD ASSEMBLY

CROSS-REFERENCE TO RELATED APPLICATIONS

This Application claims the benefit of U.S. Provisional Application No. 63/087,662, filed on 5 Oct. 2020, which is incorporated in its entirety by this reference.

TECHNICAL FIELD

This invention relates generally to the field of food production and more specifically to a new and useful modular system for manual and autonomous food assembly in the field of food production.

BRIEF DESCRIPTION OF THE FIGURES

FIG. 7 is a flowchart representation of a method.

DESCRIPTION OF THE EMBODIMENTS

Figure 1:
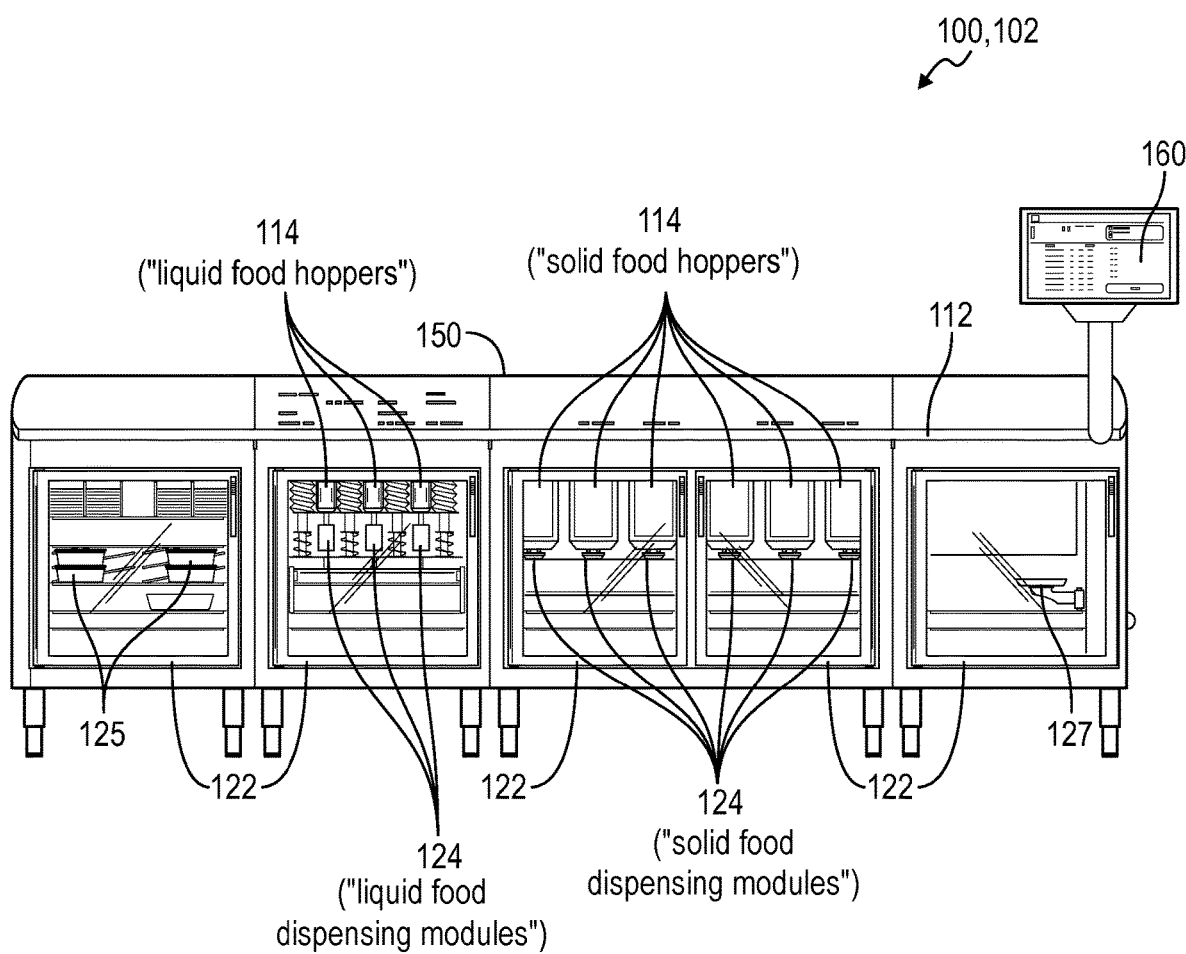
FIG. 1 is a schematic representation of a system.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

As shown in FIGS. 1, 2A, 2B, 3, 4A-4D, and 5-7, a food production station 102 for assembling units of a food product type includes: a manual assembly zone 110; an autonomous assembly zone 120; and a controller 140.

The manual assembly zone 110 includes: a food prep surface 112 located at a work surface height and configured for manual preparation of units of the food product type; and a receptacle configured to receive a sequence of food hoppers 114 configured to store ingredients for manual preparation of a food product type on the food prep surface 112.

The autonomous assembly zone 120 includes: a sequence of module housings 122, a cabinet located beneath the food prep surface 112 and including a sequence of module housings 122 supporting the food prep surface 112 and configured to transiently house a sequence of food dispensing modules 124 configured to store and dispense amounts of ingredients for autonomous preparation of units of the food product type; and a conveyor 130 located within the sequence of module housings 122 adjacent the sequence of food dispensing modules 124 and configured to transfer a set of food containers along the sequence of food dispensing modules 124 for dispensation of ingredients into the set of food containers.

The controller 140 is configured to: receive a set of food orders; and coordinate motion of the conveyor 130 and selectively trigger the sequence of food dispensing modules 124 to dispense amounts of ingredients into the set of food containers to assemble units of the food product type according to the set of food orders.

In one variation, the food production station 102 for assembling units of a food product type includes: a sequence of module housings 122; a conveyor 130; and a controller 140. In this variation, the sequence of module housings 122: support a food prep surface 112 located at a work surface height; include a receptacle configured to receive a sequence of food hoppers 114 configured to store ingredients for manual preparation of the food product type on the food prep surface 112; and is configured to transiently house a sequence of food dispensing modules 124 configured to store and dispense amounts of ingredients, received from the sequence of food hoppers 114, for autonomous preparation of units of the food product type. The conveyor 130 is: located within the sequence of module housings 122 adjacent the sequence of food dispensing modules 124; and configured to transfer a first food container along the sequence of food dispensing modules 124 for dispensation of a first set of ingredients into the first food container according to a first food order.

In this variation, the controller 140 is configured to: receive the first food order; coordinate motion of the conveyor 130 and selectively trigger the sequence of food dispensing modules 124 to dispense amounts of ingredients into the first food container to assemble a first food product of the food product type according to the first food order; track timeseries of amounts of ingredients stored within the sequence of food hoppers 114; generate a first food record for the first food product based on the timeseries of amounts of ingredients; link the first food record to the first food order; generate a second food record for a second food product of the food product type, assembled manually at the food prep surface 112 according to the second food order, based on the timeseries of amounts of ingredients; and link the second food record to the second food order.

In one variation, the food production station 102 for assembling units of a food product type includes: a manual assembly zone 110; an autonomous assembly zone 120; and a controller 140. The manual assembly zone 110 includes: a food prep surface 112 configured for manual preparation of food products and located at a work surface height; and a receptacle configured to receive a sequence of food hoppers 114 transiently located atop a back side of the food prep surface 112 and configured to store ingredients for manual preparation of units of the food product type. The autonomous assembly zone 120 includes: a cabinet located beneath the food prep surface 112 and including a sequence of module housings 122 configured to transiently house a sequence of food dispensing modules 124, each food dispensing module 124 in the sequence of food dispensing modules 124 configured to be transiently located within the autonomous assembly zone 120 and configured to be loaded with an ingredient and dispense a volume of the ingredient toward a food container; and a conveyor located adjacent the sequence of food dispensing modules 124 and configured to transfer the food container along the sequence of food dispensing modules 124 for dispensation of ingredients into the food container. The controller 140 is configured to receive a set of food orders and selectively trigger food dispensing modules 124, in the sequence of food dispensing modules 124, to dispense amounts of corresponding ingredients to assemble units of the food product type according to the set of food orders.

In one variation, the food production station 102 includes a set of sensors 170 coupled to the sequence of food hoppers 114 of the manual assembly zone 110 and the sequence of food dispensing modules 124 of the autonomous assembly zone 120 and including: a first subset of sensors configured to record temperatures of ingredients; and a second subset of sensors configured to record a quantity of each ingredient stored within the manual assembly zone 110 and the autonomous assembly zone 120.

A modular system 100 includes: a set of food production station 102s 102 configured for installation within a food service establishment; and a control program configured for execution by controller 140s of the set of food production station 102s 102.

2. Method

As shown in FIGS. 8, 9A, 9B, 10A, 10B, and 11, a method S100 includes, during a first period of time, receiving a set of food orders for assembling units of a food product type at a food production station 102 loaded with a set of ingredients and configured for: manual assembly of units of a food product type via a manual assembly zone 110 of the food production station 102; and autonomous assembly of units of the food product type via an autonomous assembly zone 120 of the food production station 102 in Block S100. The method S100 further includes: distributing a first subset of food orders, in the set of food orders, to the manual assembly zone 110 for manual preparation of units of the food product type, according to the first subset of food orders, based on characteristics of food orders, in the first subset of food orders in Block S120; and distributing a second subset of food orders, in the set of food orders, to the autonomous assembly zone 120 for automatic assembly of units of the food product type, according to the second subset of food orders, based on characteristics of food orders, in the second subset of food orders in Block S130.

One variation of the method S100 further includes, during the first period of time: tracking timeseries of amounts of ingredients, in the set of ingredients, stored within the food production station 102 in Block S140; generating a set of food records, based on timeseries of amounts of ingredients, in the set of ingredients, each food record, in the set of food records, linked to a food order in the set of food orders in Block S150.

One variation of the method S100 further includes, during a prep period succeeding the first period of time, estimating a set of predicted amounts of ingredients, in the set of ingredients, for dispensation during a second period of time succeeding the prep period, based on the set of food records in Block S170.

One variation of the method S100 includes, during a first period of time: receiving a set of food orders (e.g., submitted by patrons) at a food production station 102 configured for assembling units of a food product type according to the set of food orders in Block S110; and tracking an amount of each ingredient, in the set of ingredients, stored within the food production station 102 in Block S140. In response to receiving a first food order, in the set of food orders, at a first time within the first period of time, the method S100 further includes: recording a first received time value, in a set of received time values, corresponding to the first time in Block S112; and allocating the first food order for assembly in a manual assembly zone 110 of the food production station 102 configured for manual preparation of units of the food product type based on characteristics of the first food order in Block S120. The method S100 further includes, during a first assembly period for the first food order: estimating a first set of dispensed amounts corresponding to a first subset of ingredients, in the set of ingredients, manually dispensed by an operator to assemble a first unit of the food product type according to the first food order, based on changes in amounts of ingredients, in the first subset of ingredients, stored within the food production station 102 during the first assembly period in Block S140; in response to termination of the first assembly period at a second time succeeding the first time, recording a first complete time value, in a set of complete time values, corresponding to the second time in Block S142, and assembling a first food order record associated with the first food order and including the first received time value, the first set of dispensed amounts, and the first complete time value in Block S150.

In response to receiving a second food order, in the set of food orders, at a second time within the first period of time, the method S100 further includes: recording a second received time value, in the set of received time values, corresponding to the second time in Block S112; and allocating the second food order for assembly in an autonomous assembly zone 120 of the food production station 102 configured for automatic preparation of units of the food product type based on characteristics of the second food order in Block S130. The method S100 further includes, during a second assembly period for the second unit of the food product type: estimating a second set of dispensed amounts corresponding to a second subset of ingredients, in the set of ingredients, based on changes in amounts of ingredients, in the second subset of ingredients, stored within the food production station 102 during the second assembly period in Block S140; and, in response to termination of the second assembly period at a fourth time succeeding the third time, recording a second complete time value, in the set of complete time values, corresponding to the fourth time in Block S142, and assembling a second food order record associated with the second food order and including the second received time value, the second set of dispensed amounts, and the second complete time value in Block S150.

One variation of the method S100 includes, during a first period of time: receiving a set of food orders at a food production station 102 configured for assembling units of a food product type according to the set of food orders in Block S110; and tracking timeseries of amounts of ingredients stored within the food production station 102 in Block S140. In this variation, the method S100 further includes: in response to receiving a first food order, in the set of food orders, at a first time within the first period of time, recording a first received time value, in a set of received time values, corresponding to the first time in Block S112, and allocating the first food order for assembly in a manual assembly zone 110 of the food production station 102 configured for manual preparation of units of the food product type based on characteristics of the first food order in Block S120. The method S100 further includes, during a first assembly period for the first food order: tracking a first timeseries of amounts of ingredients stored within the food production station 102; and, in response to termination of the first assembly period at a second time succeeding the first time, recording a first complete time value, in a set of complete time values, corresponding to the second time in Block S142 and assembling a first food order record linked to the first food order and including the first received time value, the first timeseries of amounts of ingredients, and the first complete time value in Block S150.

In this variation, the method S100 further includes, in response to receiving a second food order, in the set of food orders, at a third time within the first period of time: recording a second received time value, in the set of received time values, corresponding to the third time in Block S112; and allocating the second food order for assembly in an autonomous assembly zone 120 of the food production station 102 configured for automatic preparation of units of the food product type based on characteristics of the second food order in Block S130. The method S100 further includes, during a second assembly period for the second unit of the food product type: tracking a second timeseries of amounts of ingredients stored within the food production station 102 in Block S140; and, in response to termination of the second assembly period at a fourth time succeeding the third time, recording a second complete time value, in the set of complete time values, corresponding to the fourth time in Block S142; and assembling a second food order record associated with the second food order and including the second received time value, the second set of dispensed amounts, and the second complete time value in Block S150.

2. Applications

Generally, the food production station 102 defines a reconfigurable chassis for on-demand food production and includes: a manual assembly zone 110 including a sequence of food hoppers 114 configured to be loaded with ingredients and located along a prep surface supporting manual construction of units of a food product by a worker (e.g., an "employee"); and an automated assembly zone 120 located beneath the prep surface of the manual assembly zone 110 and including a sequence of food dispensing modules 124 configured to transiently (i.e., temporarily) install in the food production station 102, configured to store ingredients, and configured to dispense amounts (e.g., masses, volumes, units) of these ingredients to autonomously construct units of a food product. For example, the autonomous assembly zone 120 can be configured to autonomously assemble generic units of the same food type that is manually assembled and customized by the worker at the manual assembly field 110. Furthermore, the food production station 102 can be assembled and reconfigured over time to produce various types of food products, such as smoothies, cold bowls (e.g., cold salads), hot bowls (e.g., hot rice bowls), cold sandwiches, hot sandwiches, cold wraps, hot wraps (e.g., burritos), desserts, coffee products, etc.

The food production station 102 can be loaded with a control program configured to intake food orders from patrons (e.g., remote and/or on-site patrons) and to selectively actuate the food dispensing modules 124 to construct instances of a food product according to these food orders. The control program can also selectively assign or distribute inbound food orders between the manual assembly zone 110 and the autonomous assembly zone 120. For example, the control program can: direct all orders received online to the autonomous assembly zone 120 for autonomous assembly; and assign all orders received in-person (e.g., from on-site patrons) to the manual assembly zone 110 for manual completion by a worker. In another example, the control program: directs food orders specifying an ingredient available in the manual assembly zone 110 but not in the autonomous assembly zone 120 to the manual assembly zone 110, and vice versa; directs food orders specifying a custom combination of amounts of ingredients to the manual assembly zone 110; and assigns all other food orders to the autonomous assembly zone 120. In another example, the control program: directs food orders to the autonomous assembly zone 120; identifies and flags ingredients in foods orders not available in the autonomous assembly zone 120; and notifies a worker to add these flagged ingredients (e.g., fanned avocados, fried eggs) to food orders via the manual assembly zone 110. In yet another example, the control program: distributes food orders between the manual and autonomous assembly zone 120s in order to maintain throughput at the manual assembly zone 110 at 80% capacity while hoppers in the manual assembly zone 110 are at least 20% full; distributes food orders exclusively to the autonomous assembly zone 120 and prompts a worker to reload hoppers in the manual assembly zone 110 once at least one of these hoppers is less than 20% full; and similarly distributes food orders exclusively to the manual assembly zone 110 and prompts a worker to reload food dispensing modules 124 in the autonomous assembly zone 120 once at least one of these food dispensing modules 124 is less than 20% full.

In one implementation, the control program includes a food prep scheduler configured to: collect real-time data on inventory of ingredients (e.g., contained within the food production station 102, previously prepped for food assembly, in storage external the food production station 102) and demand for these ingredients (e.g., based on food orders currently in a queue and historical food orders received); output real-time estimates of ingredient inventory and times when ingredients will need replenishing; and, over time, develop a model for daily food prep to maximize efficiency. The food prep scheduler can therefore be configured to enable increased efficiency in food order preparation, such as by minimizing wait times for food orders, increasing accuracy of food orders, reducing labor costs (e.g., by minimizing a quantity of workers required and/or maximizing worker efficiency), and decreasing food waste (e.g., due to unused, prepared ingredients).

The food production station 102 can be configured for installation in a food service establishment to augment manual food product assembly with autonomous food product assembly, such as to fulfill orders entered by on-site patrons and/or submitted online via remote patrons. Furthermore, multiple instances of the food production station 102 can be located within the food service establishment in order to increase food order throughput. For example, a "fast-casual" restaurant may install a first instance of the food production station 102 outside and adjacent a kitchen of the restaurant, such that patrons may assemble in a line passing by a customer-facing side of the first instance of the food production station 102. This restaurant may also install a second and third instance of the food production station 102 within the kitchen of the restaurant (e.g., out of sight of patrons) to increase food order throughput (e.g., by doubling a food order capacity of the restaurant). For example, two food production station 102s 102 can be stacked, thus disabling the manual assembly zone 110s 110 of these two food production station 102s 102 in place of the two autonomous assembly zone 120s in these two food production station 102s 102, which may yield greater maximum throughout per unit floor area at the restaurant. Therefore, in this stacked configuration, the second and third instance of the food production station 102 can each receive food orders and can autonomously prepare multiple food orders simultaneously within their respective autonomous assembly zone 120s 120. The control program can also selectively distribute food orders received from patrons between these three instance of the food production station 102 and communicate instructions for accurate and timely completion of these food orders.

3. Food Production Station

The modular system 100 can include a food production station 102 configured to install within a food service establishment (e.g., a "fast-casual" restaurant, a ghost kitchen, a food court, a cafeteria) and that can be assembled and reconfigured over time to produce various types of food product, such as smoothies, cold bowls (e.g., cold salads), hot bowls (e.g., hot rice bowls), cold sandwiches, hot sandwiches, cold wraps, hot wraps (e.g., burritos), pizzas, desserts, coffee products, etc.

Once a combination of food dispensing modules 124 are assembled onto the food production station 102 to construct a particular type of food product, the food production station 102 can be loaded with a control program configured to: intake food orders from patrons; and to selectively actuate the food dispensing modules 124 to construct instances of this food product according to these food orders.

The food production station 102 defines a base platform or "chassis" configured to support and locate a combination of food dispensing modules 124 for fulfillment of food orders. In one implementation, the food production station 102 includes: a chassis (e.g., a rigid platform) defining a food prep surface 112; and a cabinet—including a sequence of module housings—arranged beneath the food prep surface 112 and configured to house a sequence of food dispensing modules 124 for fulfillment of food orders; and a sequence of food containers (or "food hoppers")—transiently arranged within the sequence of module housings—configured to store ingredients for manual preparation of a food product type on the food prep surface. For example, the food production station 102 can include: a steel box frame configured to support a sequence of food hoppers 114 and food dispensing modules 124; a food prep surface 112 (e.g., a stainless steel surface) arranged over a top face of the steel box frame; and a set of legs (e.g., a set of round tubular legs) coupled to a bottom face opposite the top face of the steel box frame and configured to support the steel box frame.

The food production station 102 can include a sequence of food hoppers 114 arranged along a back side of the food prep surface 112 (e.g., opposite an employee working at the food production station 102) such that these food hoppers are arranged contiguously along a length of the food prep surface 112 and ordered accordingly in order to efficiently and satisfactorily complete food orders. The food production station 102 can also include a cabinet: located beneath the food prep surface 112 and within the steel box frame; including a sequence of module housings 122 configured to transiently house a sequence of food dispensing modules 124 configured to selectively dispense food ingredients according to food orders received by the food production station 102.

The food production station 102 can define a particular height (e.g., a work height) such that an employee may comfortably stand facing a front side of the food production station 102 while handling food (e.g., adding ingredients to a serving container, preparing ingredients, refilling food hoppers) on the food prep surface 112 and/or interfacing with a patron. For example, the food production station 102 can exhibit a height—between a ground surface and the food prep surface 112—approximately (e.g., within two inches) between 35 inches and 42 inches. Furthermore, the bottom surface of the food production station 102 can be offset a ground surface (e.g., the floor) in order to enable cleaning beneath the food production station 102. For example, the food production station 102 can include the set of legs defining a particular height such that: an employee may clean the bottom surface of the food production station 102 and surfaces (e.g., the floor) below the food production station 102; the food prep surface 112 sits within a working height range (e.g., between 36 and 38 inches); and the cabinet, including a sequence of food dispensing modules 124, fits between the bottom surface and the food prep surface 112.

3.1 Manual Assembly Zone

Figure 2A:
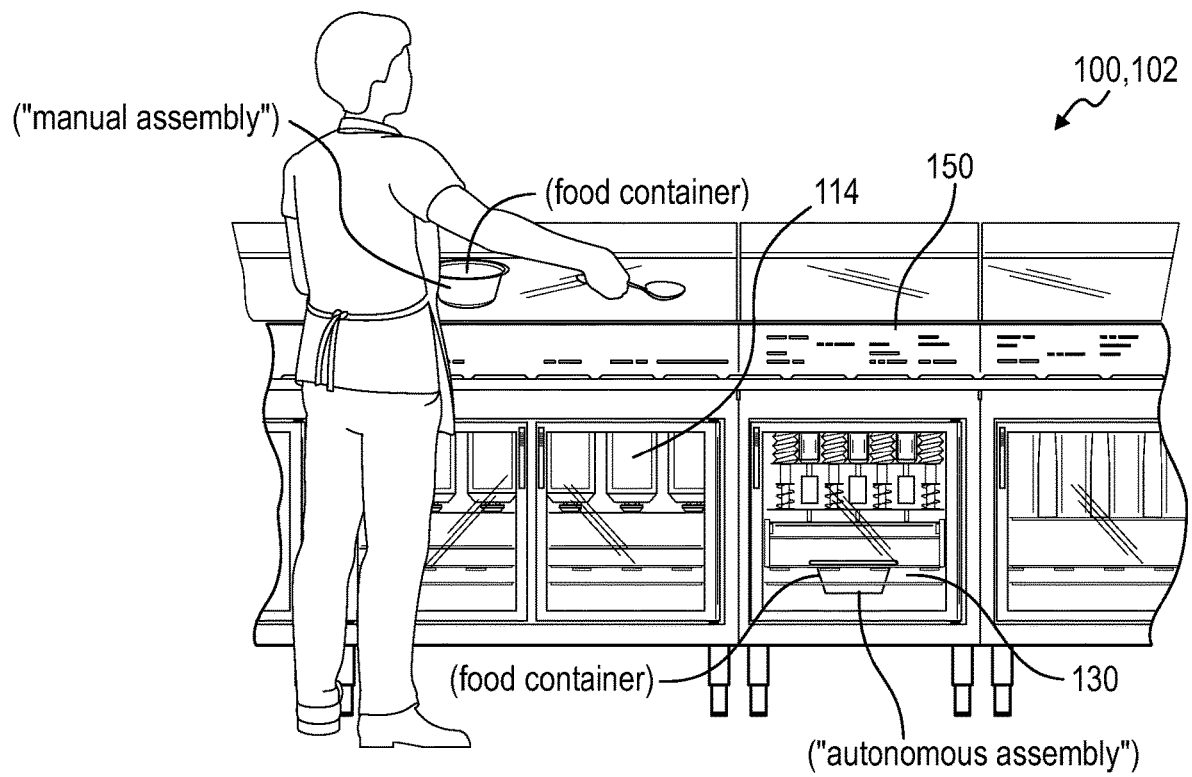
FIGS. 2A and 2B are schematic representations of the system.
Figure 2B:
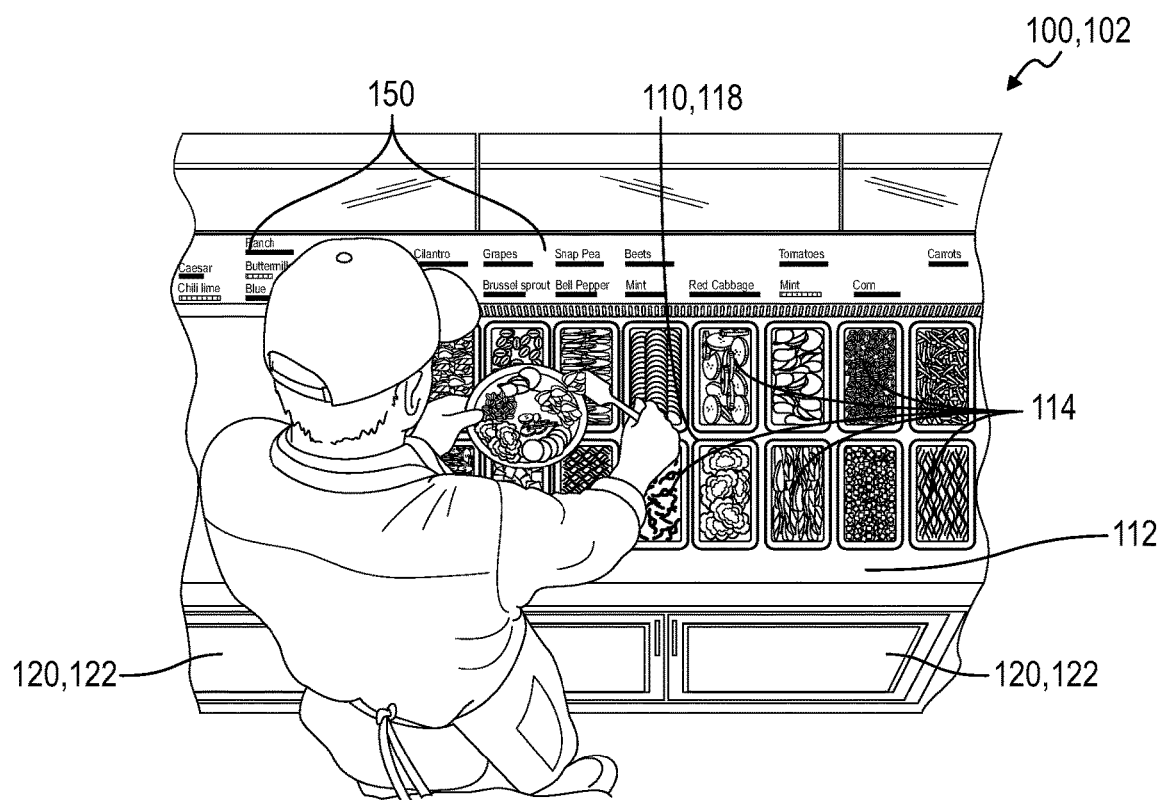
Figure 3:
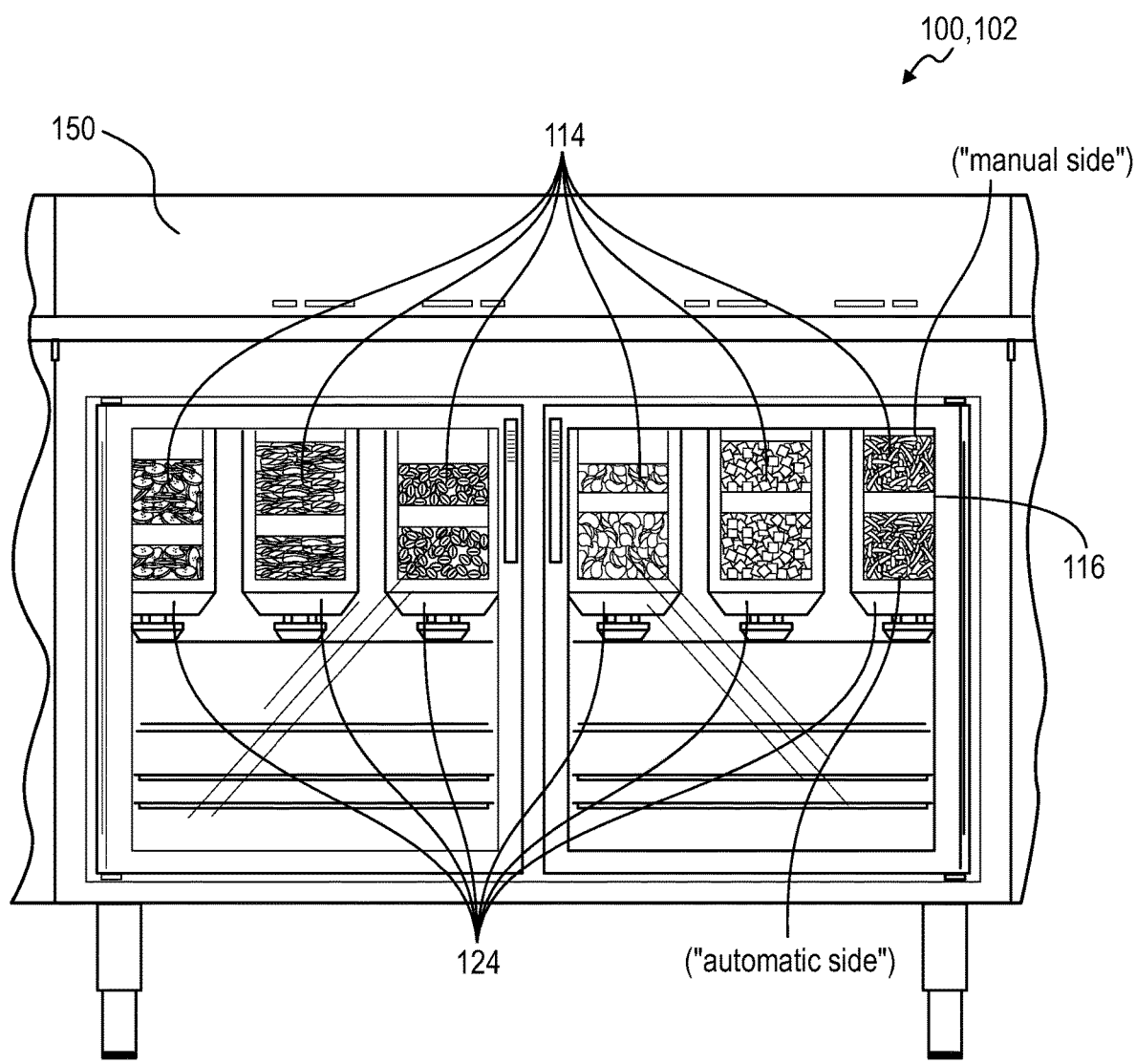
FIG. 3 is a schematic representation of the system.
Figure 4A:
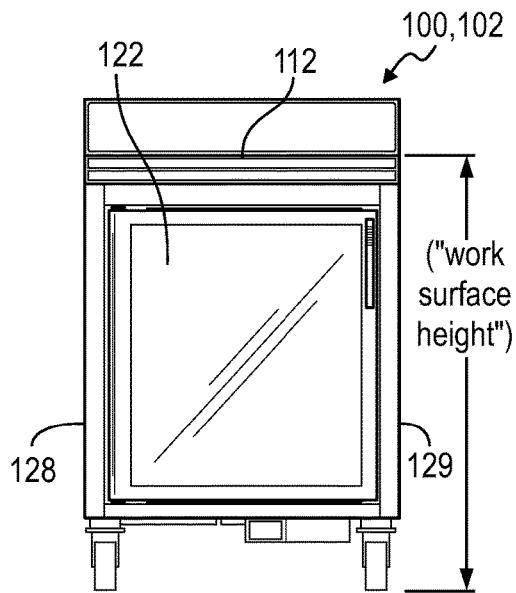
FIGS. 4A, 4B, 4C, and 4D are schematic representations of the system.
Figure 4B:
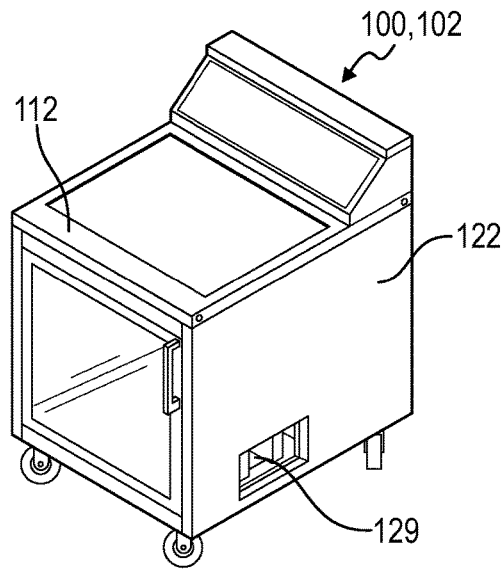
Figure 4C:
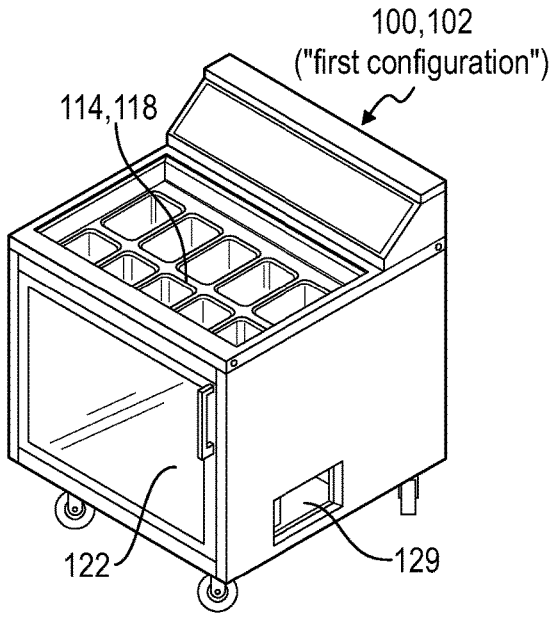
Figure 4D:
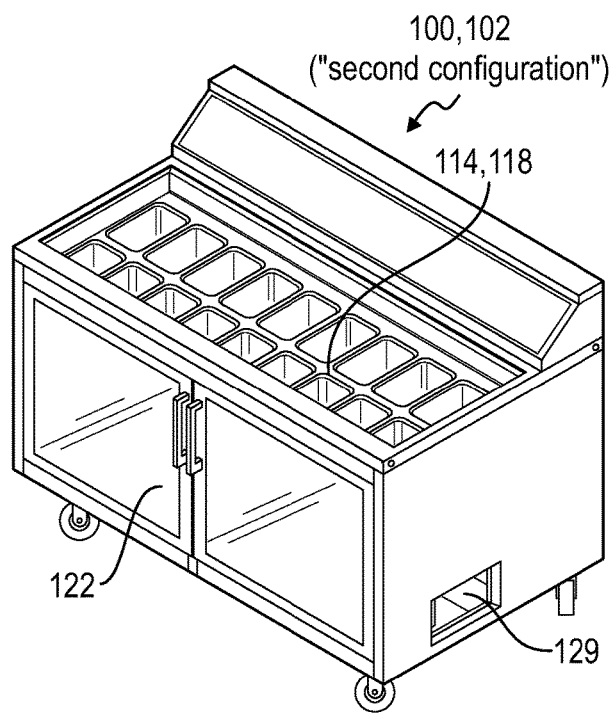
Figure 5:
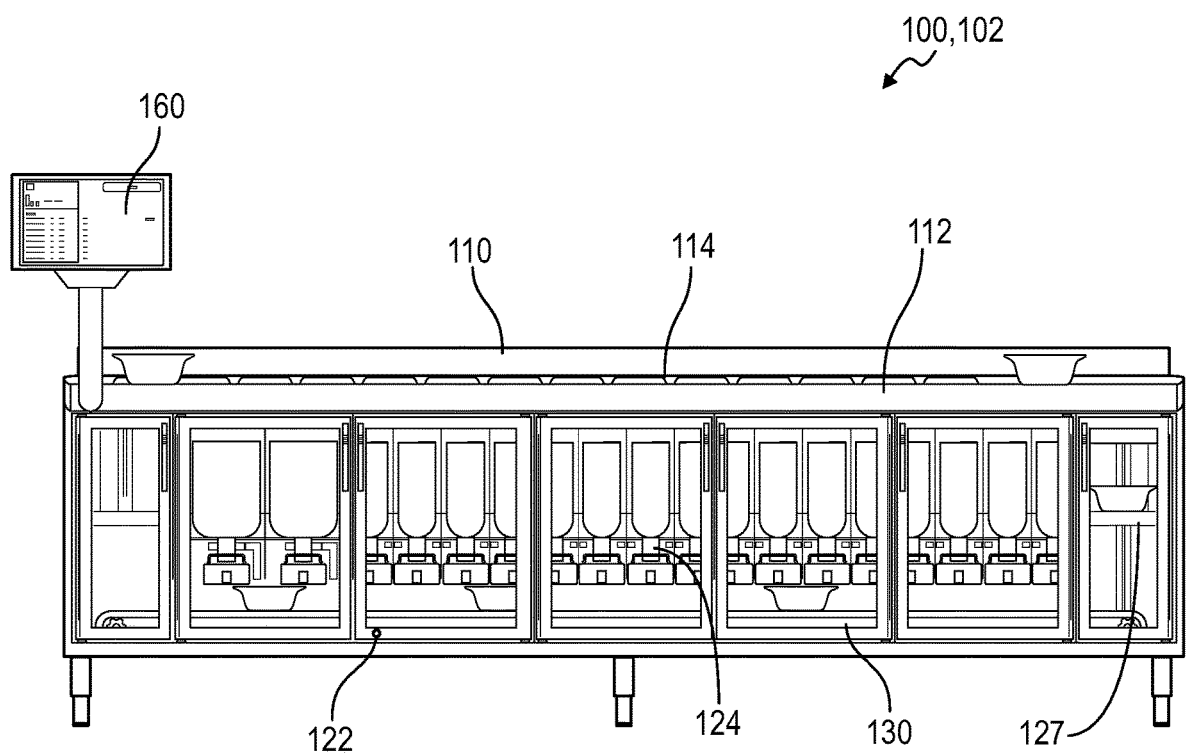
FIG. 5 is a schematic representation of the system.

The food production station 102 can include a manual assembly zone 110 including the food prep surface 112 and a receptacle configured to receive the sequence of food hoppers 114 transiently located atop the food prep surface 112 and configured to store ingredients for manual preparation of units of food products according to food orders submitted by patrons. As shown in FIGS. 2A and 2B, the manual assembly zone 110 can be configured such that an employee may stand facing a front side of the food production station 102—proximal the sequence of food hoppers 114—to handle ingredients and/or assemble food orders while a patron views and/or points at ingredients along a back side of the food production station 102.

3.2 Autonomous Assembly Zone

The food production station 102 can include an autonomous assembly zone 120 located below the food prep surface 112 of the manual assembly zone 110. The autonomous assembly zone 120 includes: a sequence of module housings 122 configured to house a set of food-handling modules (e.g., food dispensing modules 124, food processing modules); a conveyor configured to move a food container along a length of the autonomous assembly zone 120 as the food container is filled with ingredients; and a controller 140 configured to receive food orders from patrons and selectively actuate the set of food-handling modules for dispensation of ingredients in order to complete these food orders. The autonomous assembly zone 120 can include a sequence of food hoppers 114 configured to store ingredients corresponding to food orders. In one implementation, as described above, the sequence of food hoppers 114 located along the manual assembly zone 110 are coupled to the set of food-handling modules of the autonomous assembly zone 120, such that the sequence of food hoppers 114 can be configured to store ingredients for both the manual assembly zone 110 and the autonomous assembly zone 120.

3.2.1 Module Housings

The autonomous assembly zone 120 can include a sequence of module housings 122 configured to transiently locate food dispensing modules 124 and food processing modules along a food-handling side of the autonomous assembly zone 120, such as a first long side of the autonomous assembly zone 120. In one implementation, the autonomous assembly zone 120 defines module housings 122 and configured to transiently receive food dispensing and processing modules defining a standard footprint. In this implementation, individual food dispensing and processing modules can be loaded into individual module housings 122 along the food-handling side of the autonomous assembly zone 120 to form an assemblage of modules that cooperate to dispense a particular combination of ingredients and to construct these ingredients into a food product of a particular type. In one example, the autonomous assembly can include module housings 122 of a fixed unit dimension. Alternatively, in another example, the autonomous assembly can include module housings 122: of a fixed height (e.g., equivalent the work surface height of the food prep surface 112) such that each module housing 122 supports the food prep surface; and of a custom length such that each module housing is configured to transiently house a particular quantity of food dispensing modules and/or food hoppers.

For example, as shown in FIG. 1, the food production station can include a sequence of module housings 122 including: a first module housing configured to transiently house a first set of food dispensing modules in the sequence of food dispensing modules 124 and defining a first length; and a second module housing configured to transiently house a second set of food dispensing modules in the sequence of food dispensing modules 124 and defining a second length greater than the first length.

The sequence of module housings 122 can include a sequence of inlets 128 and a sequence of outlets 129 configured to enable transfer of a food container between food module housings in the sequence of module housings 122. In particular, each food module housing, in the sequence of module housings 122, can include: an inlet configured to receive a food container for dispensation of ingredients into the food container within the food module housings; and an outlet configured to output the food container from within the food module housing. Further, the food production station 102 can include a sequence of connector features configured to couple food module housings with contiguous food module housings in the sequence of module housings 122 and enable transfer of the food container between contiguous food module housings via the sequence of inlets 128 and outlets 129.

For example, the autonomous assembly zone 120 can include a sequence of module housings 122 configured to transiently house a sequence of food dispensing modules 124. The sequence of module housings 122 can include a first food module housing: configured to transiently house a first set of food dispensing modules 124 in the sequence of food dispensing modules 124; including a first inlet configured to receive a food container for dispensation of ingredients by the first set of food dispensing modules 124 into the food container within the first food module housing; and including a first outlet configured to direct the container from within the first food module housing toward a second food module housing. The sequence of module housings 122 can further include the second food module housing: configured to transiently house a second set of food dispensing modules 124 in the sequence of food dispensing modules 124; including a second inlet configured to receive the food container, from the outlet of the first food module housing, for dispensation of ingredients by the second set of food dispensing modules 124 into the food container within the second food module housing; and including a second outlet configured to direct the container outward from within the second food module housing.

Further, in this example, the food production station 102 can include a set of connector features configured to couple the first food module housing with the second food module housing to align the first outlet with the second inlet, such that the food container can be transferred between the first and second food module housings—via alignment of the first outlet of the first food module housing with the second inlet of the second food module housing—to receive ingredients dispensed by both the first set of food dispensing modules 124 and the second set of food dispensing modules 124.

Additionally and/or alternatively, in another implementation, each food module housing, in the sequence of module housings 122, can be configured to transiently house a sequence of food dispensing modules 124 of a particular type, such as configured to dispense a particular type of ingredient. For example, the food production station 102 can include a first food module housing (e.g., a freezer unit) configured to transiently house a sequence of frozen food dispensing modules 124 configured to dispense metered volumes of frozen ingredients. In this example, the first food module housing can be configured to regulate a temperature of frozen ingredients stored within the food module housing below a defined maximum temperature for the frozen ingredients. Additionally, in this example, the food production station 102 can include: a second food module housing (e.g., a refrigerated unit) configured to transiently house a sequence of refrigerated food dispensing modules 124; a third food module housing (e.g., a room-temperature unit) configured to transiently house a sequence of room-temperature food dispensing modules 124; and/or a fourth food module housing (e.g., a heated unit) configured to transiently house a sequence of hot food dispensing modules 124.

In the preceding example, the sequence of module housings 122 can include thermal insulation, such that each food module housing, in the sequence of module housings 122, is thermally isolated from each contiguous food module housing, in the sequence of module housings 122.

In another example, the autonomous assembly zone 120 can include a sequence of module housings 122 defining: a first sequence of module housings configured to transiently house a first sequence of food dispensing modules 124 configured to dispense liquid food ingredients (e.g., sauces, dressings, cream, juices, beverages); and a second sequence of module housings configured to transiently house a second sequence of food dispensing modules 124 configured to dispense solid food ingredients (e.g., fruits, vegetables, meat products). In particular, in one example: individual liquid-food dispensing modules can be loaded into a first module housing along the food-handling side of the autonomous assembly zone 120; individual solid-food dispensing modules 124 can be loaded into a second module housing along the food-handling side of the autonomous assembly zone 120; and individual food processing modules can be loaded into a third module housing along the food-handling side of the autonomous assembly zone 120. Then, upon receiving an order for a particular smoothie, the system can: dispense a first volume of juice into a blender located below a first dispenser at the first module housing; dispense a second volume of frozen fruit into the blender now located below a second dispenser at the second module housing; and locate the blender at the third module housing for blending of the ingredients to make the smoothie.

Additionally and/or alternatively, in yet another implementation, the food production station can be configured to include a sequence of module housings 122 configured to transiently house different types of modules (e.g., food dispensing modules, food processing modules, container dispensing modules). In one example, the food production station 102 can include a sequence of module housings 122 including: a first module housing (e.g., a container module housing) configured to transiently house a set of food container dispensing modules configured to selectively release food containers according to the set of food orders; a sequence of food module housings configured to transiently house the sequence of food dispensing modules 124 and receive food containers from the container module housing; and a third module housing (e.g., a staging module housing) configured to receive the food container from the sequence of food module housings and transiently house a set of food staging modules—such as a set of lid dispensing modules 126 and/or a food elevator 127—configured to prepare the food container, loaded with ingredients, for presentation to a patron.

Alternatively, in another implementation, the autonomous assembly zone 120 can define a continuous module rack or otherwise unabridged slots for food-handling modules along the first side of the autonomous assembly zone 120. For example, the autonomous assembly zone 120 can include a single continuous rail or a set of continuous, parallel rails extending along the food-handling side of the autonomous assembly zone 120 parallel to the anteroposterior axis of the autonomous assembly zone 120. In this example, a food dispensing or processing module can be loaded onto the rail(s), shifted longitudinally to a desired longitudinal position, and then locked onto the linear rack, such as with a threaded fastener or with a clamp.

However, the autonomous assembly zone 120 can include or define delineated module housings 122 or a continuous food-handling rack in any other form and can interface with food dispensing and processing modules in any other way.

3.2.1.1 Food Dispensing Modules

The food production station 102 also includes: a sequence of food dispensing modules 124, each food dispensing module 124 (e.g., automatic dispenser) configured to transiently install on the autonomous assembly zone 120 proximal the conveyor 130 and configured to dispense an amount (e.g., a volume, a mass, a number of units) of an ingredient toward the conveyor 130 (e.g., into a food container on the conveyor 130); and a set of food processing modules, each configured to transiently install on the autonomous assembly zone 120 proximal the conveyor 130 and configured to modify ingredients (e.g., in the food container) dispensed from food dispensing modules 124 into the food container. Generally, the food production station 102 includes a population of food dispensing modules 124 and food processing modules configured to: dispense and modify ingredients, respectively, responsive to control inputs received from controller 140s in the autonomous assembly zone 120; and to then be removed from the food production station 102 for cleaning and reloading with ingredients before deployment. For example, a worker may rapidly and easily remove (e.g., without any tools) a food dispensing module 124 from the food production station 102 for cleaning, reload the food dispensing module 124 with a particular ingredient, and replace the food dispensing module 124 within the food production station 102.

In one implementation, the autonomous assembly zone 120 includes liquid dispensing modules configured to dispense metered volumes of liquid, such as juice, water, and low-viscosity (or "thin") sauces. In a similar implementation, the autonomous assembly zone 120 includes food paste dispensing modules configured to dispense metered volumes of gels and higher-viscosity liquids, such as butters, yogurt, and thick sauces (e.g., dressings).

In one example, the autonomous assembly zone 120 can include liquid dispensing modules including: a liquid container loaded with a volume of the liquid; and an automatic dispenser, coupled to the liquid container, and configured to dispense metered amounts of the liquid into food containers below for assembling food orders including this liquid. In this example, the liquid dispensing module can be configured to: dispense a metered amount of the liquid directly into a food container loaded with other ingredients for assembling a particular food order; and/or dispense a metered amount of the liquid into a secondary food container (e.g., within the food container or presented "on the side") served with the food container to a patron associated with the particular food order.

Alternatively, in another example, as shown in FIGS. 1 and 2A, the autonomous assembly zone 120 can include liquid dispensing modules configured to dispense secondary food containers preloaded with set volumes of liquids. In this example, liquid dispensing modules can be configured to: receive a set of secondary food containers, each secondary food container in the set of secondary food containers pre-filled with a volume of a liquid ingredient (e.g., a sauce, dressing, butter, yogurt); and selectively dispense units of these secondary food containers—according to received food orders—into food containers loaded with ingredients specified by these food orders. Additionally and/or alternatively, in this example, liquid dispensing modules can be configured to empty contents (e.g., volumes of liquids) contained in the set of secondary food containers into food containers according to received food orders, such as by removing a lid coupled to the secondary container and emptying (or pouring) a volume of a liquid—previously loaded into the secondary food container—into a food container located on the conveyor below the food dispensing module.

In each of these implementations, a liquid or food paste dispensing module can also include an in-line chiller configured to cool dispensed liquid, such as: one integrated in-line chiller per liquid or food paste dispensing module; or one integrated in-line chiller shared between a group of liquid and/or food paste dispensing modules (e.g., within a food module housing transiently loaded with the group of liquid and/or food paste dispensing modules). Similarly, a liquid or food paste dispensing module can also include an in-line heater configured to heat dispensed liquid (e.g., sauces, soups).

In another implementation, the autonomous assembly zone 120 includes: frozen-food dispensing modules 124 configured to dispense metered volumes or mass units of ice, frozen fruits, and frozen vegetables; refrigerated-food dispensing modules 124 configured to dispense metered volumes or mass units of fresh ingredients (e.g., fruits, vegetables, meats, dairy products); warm-food dispensing modules 124 configured to dispense metered volumes or mass units of warm prepared ingredients (e.g., vegetables, meats, rice, noodles); and dry-food dispensing modules 124 configured to dispense metered volumes or mass unites of ambient temperature ingredients (e.g., granola, nuts, seeds, dried fruit).

In yet another implementation, the autonomous assembly zone 120 includes slicing-type dispensing modules configured: to be loaded with whole (or nearly-whole) units of ingredients, such as lettuce, onion, tomato, kiwi, or apple; to slice stored ingredients when triggered by controller 140s; and to dispense ingredient slices.

In another implementation, the autonomous assembly zone 120 includes powder food dispensing modules 124 configured to dispense metered volumes or mass units of powdered goods, such as salt, sugar, spices, or seeds.

The autonomous assembly zone 120 can include any combination of these types of food dispensing modules 124. In one implementation, the autonomous assembly zone 120 includes multiple sets of food dispensing modules 124. For example, the food production station 102 can be configured for assembling smoothies. In this example, the autonomous assembly zone 120 can include: a first set of food dispensing modules 124 configured to dispense metered volumes of different flavored yogurts; a second set of food dispensing modules 124 configured to dispense metered volumes of frozen fruits; and a third set of food dispensing modules 124 configured to dispense different liquid bases (e.g., coffee, orange juice, milk). In this example, in response to receiving a food order for a particular smoothie, the system can dispense: a first volume of vanilla yogurt from a first food dispensing module 124 in the first set of food dispensing modules 124; a second volume of frozen pineapple from a second food dispensing module 124 in the second set of food dispensing modules 124; and a third volume of orange juice from a third food dispensing module 124 in the third set of food dispensing modules 124.

However, the autonomous assembly zone 120 can include food dispensing modules 124 configured to dispense or meter ingredients of any other type or format.

3.2.1.2 Food Hoppers

In one implementation, the sequence of food hoppers 114 of the manual assembly zone 110 and the food dispensing modules 124 of the autonomous assembly zone 120 are physically coextensive, such that the sequence of food hoppers 114 supply ingredients to both the manual assembly zone 110 and the autonomous assembly zone 120.

For example, the food production station can include a sequence of module housings: supporting the food prep surface located at a work surface height; defining a receptacle configured to receive the sequence of food hoppers configured to store ingredients for manual preparation of units of the food product type on the food prep surface; and configured to transiently house the sequence of food dispensing modules 124 configured to store and dispense volumes of ingredients, received from the sequence of food hoppers, for autonomous preparation of units of the food product type. In this example, each food dispensing module 124, in the sequence of food dispensing modules 124, can be transiently coupled to a food hopper, in the sequence of food hoppers.

For example, the food production station 102 can include a food hopper, transiently loaded in a receptacle of the manual assembly zone 110, extending downward from the prep surface of the manual assembly zone 110 into the autonomous assembly zone 120, and coupled to an automatic dispenser (i.e., a food dispensing module). When filled with an ingredient, the reservoir can feed the automatic dispenser to automatically complete food orders via the autonomous assembly zone 120. Further, a worker may reach into the reservoir (e.g., from an opening approximately flush the prep surface) to access the ingredient for completion of food orders via the manual assembly 110.

In one variation, the food hopper can include a guard 116 (or "divider")—installed at a particular depth within the food hopper—configured to prevent human injury, such as by physically preventing contact between the user's hand or fingers with the automatic dispenser coupled to a lower region of the food hopper. Additionally and/or alternatively, in this variation, the divider 116 (e.g., an automatic divider 116) can be configured to: divide the reservoir or food hopper into an upper side (or "manual side") and a lower side (or "automatic side"); and selectively supply ingredients—loaded within the food hopper—to the upper and lower side. For example, the food hopper can include a divider 116 configured to: automatically divide units of an ingredient between a manual side and an automatic side; and prevent human contact with the automatic dispenser coupled to the automatic side of the food hopper. In this example, the food hopper can include a scale or depth sensor configured to monitor a fill level of the ingredient in the food hopper in both the manual side and the automatic side. The controller 140 can then shift this automatic divider 116 to adjust the load (e.g., fill level) of either side of the reservoir, such as by oscillating the divider 116 to drop ingredients from the manual side downward into the automatic side.

Additionally and/or alternatively, in this variation, the divider can be configured to: divide the reservoir into a manual side defined by a food hopper and an automatic side defined by a food dispensing module (e.g., automatic dispenser) coupled to the food hopper; and selectively supply ingredients—loaded within the food hopper—to the manual and automatic side. For example, the controller can be configured to selectively trigger oscillation of the divider to drop ingredients (e.g., a particular amount of an ingredient) stored in the food hopper into the automatic dispenser, coupled to the food hopper, to enable autonomous assembly of a unit of a food product type.

Alternatively, the sequence of food hoppers 114 of the manual assembly zone 110 can be configured to supply ingredients only to the manual acclimation zone 110 and the sequence of food dispensing modules 124 of the autonomous assembly zone 120 can be configured to supply and dispense ingredients only to the autonomous assembly zone 120 110. For example, each food dispensing module 124 can include: an automatic food hopper configured to house a particular ingredient; and an automatic dispenser coupled to the automatic food hopper and configured to automatically dispense a quantity (e.g., volume, mass, unit) of the particular ingredient contained in the automatic food hopper.

3.2.1.3 Container Dispensing Modules

In one variation, the food production station 102 includes a module housing, in the sequence of food module housings 122, configured to transiently house a set of container dispensing modules 125 configured to dispense containers for loading with ingredients stored within the food production station 102 according to a food order.

For example, the food production station 102 can include a sequence of module housings 122 including: a container module housing configured to transiently house a set of container dispensing modules 125; and a sequence of food module housings 122 configured to receive food containers dispensed from the set of container dispensing modules 125 for dispensation of ingredients into food containers. The container module housing can be coupled to a first food module housing, in the sequence of food module housings 122, such that an outlet of the container module housing is aligned with an inlet of the first food module housing, thereby enabling transfer of food containers from within the container module housing to within the first food module housing 122.

In this example, the sequence of container dispensing modules 125 can include: a first container dispensing module configured to dispense containers of a first size (e.g., a small size) and configured to hold units of a first food product (e.g., cold food bowls); a second container dispensing module configured to dispense containers of a second size (e.g., a large size) and configured to hold units of the first food product; a third container dispensing module configured to dispense containers of the first size and configured to hold units of a second food product (e.g., hot food bowls); a fourth container dispensing module configured to dispense containers of the second size and configured to hold units of the second food product; and a fifth container dispensing module configured to dispense containers of a third size and configured to hold volumes of sauces, dressings, and/or dips. The controller 140 can then trigger dispensation of a particular container, via the first, second, third, fourth, and/or fifth container dispensing modules 125, onto the conveyor 130 according to food orders received.

3.2.1.4 Food Staging Module

In one variation, the food production station 102 includes a module housing, in the sequence of module housings 122, configured to transiently house a sequence of food staging modules configured to prepare a unit of a food product—loaded with a set of ingredients according to a corresponding food order submitted by a patron—for presentation to the patron.

For example, the food production station 102 can include a sequence of module housings 122 including: a container module housing configured to transiently house a set of container dispensing modules 125; a sequence of food module housings 122 configured to receive a food container from the first module housing and configured to transiently house a sequence of food dispensing modules 124; and a food staging module housing configured to receive the food container from the sequence of food module housings 122 and configured to transiently house a sequence of food staging modules configured to prepare a unit of a food product—corresponding to the food container—for presentation to a patron associated with the unit of the food product. The food staging module housing can be coupled to a final food module housing, in the sequence of food module housings 122, such that an inlet of the food staging module housing is aligned with an outlet of the final food module housing, thereby enabling transfer of food containers from within the final food module housing to within the food staging module.

In this example, the sequence of food staging modules can include: a set of lid dispensing modules 126 configured to dispense a particular lid—matched to the food order and/or the food container—onto the food container; a labelling module configured to dispense (e.g., print) a set of labels matched to the food order—such as displaying a name of the patron associated with the food order and/or a food product type associated with the food order—and affix the set of labels to the lid and/or food container; and a serving module (e.g., a food elevator 127) configured to direct the assembled unit of the food product (e.g., in the food container) toward the food prep surface 112 for collection by a worker and/or presentation to the patron.

3.2.2 Conveyor

The food production station 102 can further include a conveyor 130 module configured to install along the autonomous assembly zone 120 and to move a container or other packaging along a sequence of food dispensing and processing modules as the container or packaging is filled with ingredients and processes (e.g., blended, mixed, heated) according to a food order received from a patron. For example, the autonomous assembly zone 120 can include a conveyor module including a continuous belted conveyor 130, a small-scale automated pallet system, a guided linear actuator, or a timing screw.

The food production station 102 can be configured to prepare multiple food orders simultaneously. In particular, the conveyor 130 can be configured to transport multiple containers or other packaging along the sequence of the food dispensing and processing modules concurrently such that the food production station 102 can output a continuous stream of food orders. For example, at a first time, the conveyor 130 can receive a first food container at an initial position along the conveyor. Then, at approximately a second time, the conveyor 130 can: move the first food container from the initial position to a first position at a first food dispensing module; and receive a second food container at the initial position. At approximately a third time, the conveyor 130 can: move the first food container from the first position to a second position at a second food dispensing module; move the second food container from the initial position to the first position; and receive a third food container at the initial position. Therefore, the food production station 102 can begin assembly of additional food orders in the food order queue before completing previous food orders in the food order queue, thus maximizing throughput of food order completion.

3.2.3 Segmented Conveyor

In one implementation, the conveyor 130 can be segmented such that the conveyor 130 can move different food orders non-linearly (e.g., at different rates, to different food dispensing modules 124) within the food production station 102.

In one implementation, the conveyor includes a sequence of conveyor units arranged within the sequence of module housings adjacent the sequence of food dispensing modules. In this implementation, each module housing can include a conveyor unit, in the sequence of conveyor units, extending between an inlet and an outlet of the corresponding module housing. Further, the conveyor can include a set of connector features configured to align and/or couple contiguous conveyor units, in the sequence of conveyor units, such that the sequence of conveyor units can cooperate to transfer food containers between module housings and along the sequence of food dispensing modules. Additionally and/or alternatively, in this implementation, the conveyor can include a set of conveyor handoffs configured to transfer containers between contiguous conveyor units in the sequence of conveyor units.

For example, the conveyor can be: located within the sequence of module housings adjacent the sequence of food dispensing modules; and configured to transfer a first food container along the sequence of food dispensing modules for dispensation of a first set of ingredients into the first food container according to a first food order. In this example, the sequence of module housings can include: a first food module housing configured to transiently house a first set of food dispensing modules in the sequence of food dispensing modules; and a second food module housing configured to transiently house a second set of food dispensing modules in the sequence of food dispensing modules.

In this example, the conveyor can include: a first conveyor unit arranged within the first food module housing proximal the first set of food dispensing modules within the first food module housing; and a second conveyor unit arranged within the second module housing adjacent the second set of food dispensing modules. The first conveyor unit can be configured to transfer the first food container from a first inlet of the first food module housing to a first outlet of the first food module housing, for dispensation of ingredients from the first set of food dispensing modules into the first food container. The second conveyor unit can be configured to: receive the first food container at a second inlet of the second food module housing from the first outlet of the first food module housing; and transfer the first food container from the second inlet to a second outlet of the second food module housing for dispensation of ingredients from the second set of food dispensing modules into the food container. Thus, the first and second conveyor unit can cooperate to transfer the first container toward corresponding food dispensing modules, distributed between multiple module housings, for loading the first container with ingredients.

Further, in the preceding example, the controller can actuate the first and second conveyor units independently, thereby reducing wait times for food orders by reducing wait times between dispensation of ingredients in the autonomous assembly zone. For example, the controller can: actuate the second conveyor unit to locate the first container adjacent a first food dispensing module, in the second set of food dispensing modules, located in the second food module housing; and halt actuation of the second conveyor unit and actuate the first food dispensing module to dispense ingredients into the first food container. Simultaneously, during dispensation of ingredients into the first food container on the second conveyor unit, the controller can: actuate the first conveyor unit to locate a second food container adjacent a second food dispensing module, in the first set of food dispensing modules, located in the first food module housing.

In another example, the conveyor 130 can include: a first conveyor segment 132 (or "conveyor unit") extending between a first food dispensing module 124 and a second food dispensing module; and a second conveyor segment 132 extending between the second food dispensing module 124 and a third food dispensing module 124. In this example, the conveyor 130 can actuate the first conveyor segment 132 to move a first food container from the first food dispensing module 124 to the second food dispensing module 124. As the first food container is filled with a first ingredient in the first food dispensing module 124, the conveyor 130 can again actuate the first conveyor segment 132 to move a second food container from the first food dispensing module 124 toward the second food dispensing module 124. If, however, the second food container corresponds to a food order not including the first ingredient, the conveyor 130 can actuate the second conveyor segment 132 to move the second food container past the second food dispensing module 124 and toward a third food dispensing module 124. Therefore, the conveyor 130 can continue to move the second food container past the first food container for filling with other ingredients and/or completion of the food order, rather than wait for the first food container at the second food dispensing module 124.

Additionally and/or alternatively, in another implementation, the conveyor 130 can be configured to rotate an orientation (e.g., radial orientation) of food containers or other food order packaging relative the food dispensing modules 124 in order to achieve a particular presentation of ingredients within these containers. For example, the conveyor 130 can be configured to rotate a salad bowl radially (e.g., 360 degrees) while ingredients are dispensed from each food dispensing module 124, such that the salad bowl exhibits an approximately even distribution (e.g., radial distribution) of ingredients. In another example, the conveyor 130 can be configured to rotate an acai bowl between food dispensing modules 124, such that different ingredients are located in different regions of the acai bowl. In yet another example, the conveyor 130 can be configured to shift a food container laterally (e.g., perpendicular a dispense path of ingredients dispensed into the food container). Alternatively, in another example, a food ejector (e.g., food dispensing chute) of a food dispensing module 124 can be configured to move positions in order to dispense an ingredient into a particular region of the food container.

3.3 Controller

The food production station 102 can include a controller 140 configured to intake food orders from patrons and to selectively actuate the food processing and dispensing modules to construct instances of a food product according to these food orders. More specifically, the autonomous assembly zone 120 can include an integrated controller 140 configured to: receive or access orders submitted by patrons via a user interface (e.g., arranged on a customer-facing façade of the food production station 102, arranged within a food establishment (e.g., a ghost kitchen), or within a native food ordering application executing on user's mobile computing device) and/or via direct interaction with an employee; and handle autonomous fulfillment of these orders by triggering actuation of food dispensing and processing modules 140 in the food production station 102, such as via the database described above.

The autonomous assembly zone 120 can also include a wireless communication module coupled to the controller 140 and configured to: receive food orders for patrons; communicate errors, order fulfillment data, and/or fill status of food dispensing modules 124 in the food production station 102 to a remote computer system; and receive control-related updates executable by the controller 140 when processing food orders. Alternatively, the controller 140 and wireless communication module (and/or other controls—and communications—related subsystems) can be arranged in a controls module configured to transiently install in a food production station 102.

In one variation, food dispensing modules 124 include a sub-controller 140 configured to locally control dispensation of metered volumes of an ingredient contained in this food dispensing module 124—such as by implementing closed-loop controls to drive actuators in the food dispensing module 124 based on outputs of various sensors integrated into the food dispensing module 124—responsive to receipt of a command from the controller 140 to dispense this amount of the ingredient.

3.4 Sensors

The food production station 102 can include a set of sensors 170 couple to the sequence of food hoppers 114 located on the food prep surface 112 of the manual assembly zone 110 and the sequence of food dispensing modules 124 of the autonomous assembly zone 120. The set of sensors 170 can be configured to record temperatures of ingredients contained in the sequence of food hoppers 114 and/or the sequence of food dispensing modules 124 (e.g., coextensive or separated the sequence of food hoppers 114) to monitor food quality and food safety of these ingredients over time. Furthermore, the set of sensors 170 can be configured to record ingredient levels of ingredients (e.g., weight in ounces, volume of a food hopper filled, percentage of the food hopper filled, quantity of servings remaining) stored within the food production station 102 (e.g., in the sequence of food hoppers 114 and/or food dispensing modules 124), the ingredient level corresponding to an amount remaining of a particular ingredient loaded in a food hopper and/or food dispensing module 124 within the food production station 102.

For example, the food production station 102 can include a first food dispensing module 124 extending downward from the prep surface of the manual assembly zone 110 into the autonomous assembly zone 120. The first food dispensing module 124 can include: a food hopper configured to supply units of a first ingredient for manual preparation of units of a food product type in the manual assembly zone 110 and autonomous preparation of units of the food product type in the autonomous assembly zone 120; and an automatic dispenser coupled to the food hopper and configured to selectively dispense units of the first ingredient according to food orders received from patrons (e.g., via the controller 140).

In this example, the food hopper can include: a manual side arranged proximal the food prep surface 112 and configured to transiently store ingredients for manual preparation of units of the food product type; and an autonomous side arranged proximal the automatic dispenser, below the manual side, and configured to transiently store ingredients for autonomous preparation of units of the food product type. The food production station 102 can include: a first level sensor (e.g., a depth sensor) coupled to the manual side of the food hopper and configured to record a first remaining amount (e.g., by weight, by fill level, by volume percentage) of the first ingredient within the manual side; a second level sensor coupled to the autonomous side of the food hopper and configured to record a second remaining amount of the first ingredient within the autonomous side; and a temperature sensor coupled to the food hopper and configured to record a temperature (e.g., an average or representative temperature) of units of the first ingredient stored within the food hopper.

3.5 Makeline Interface

As shown in FIGS. 1, 2A, and 2B, the food production station 102 can include a makeline interface 150 configured to display information regarding status of ingredients loaded within the food production station 102. For example, the food production station 102 can include a makeline interface 150: located on a back side of the food prep surface 112 (e.g., visible to a worker standing along the food-handling side of the food production station); and extending a length of the food prep surface 112.

In this example, the makeline interface 150 can be configured to display: a location of each ingredient (e.g., a location of a hopper containing the ingredient) loaded within the food production station 102; a current fill level of each ingredient; ingredients needing replenishment immediately or within a particular duration of time (e.g., by flashing or highlighting these ingredient names in a particular color); ingredients required for assembling a particular order; etc.

In one implementation, the makeline interface 150 can include a sequence of interfaces, each interface in the sequence of interfaces coupled to a module housing, in the sequence of module housings. In this implementation, each interface, in the sequence of interfaces, can be configured to display information associated with ingredients loaded in a corresponding module housing.

3.6 Kitchen Display

The food production station 102 can also include a display 160 (or "kitchen display") configured to display information regarding status of ingredients and/or food orders to employees who are handling, preparing, and/or serving food. For example, the food production station 102 can include a monitor located on the food prep surface 112 of the manual assembly zone 110 and configured to display a prioritized list of ingredients needing replacement, such as based on a quantity of these ingredients remaining and/or ingredients needed to complete queued food orders (e.g., food orders received and not yet completed).

3.5 Housing and Ordering Interface

The food production station 102 can also include an exterior housing configured to enclose food dispensing and processing modules, the conveyor 130, etc. located on a food production station 102 and to define an exterior façade for users interacting with or viewing a food production station 102, thereby both concealing these modules from view and enabling tighter control of an environment (e.g., temperature, humidity) inside the food production station 102.

The housing can also include a set of inspection windows, configured to open and close for accessing and/or viewing of the food dispensing and processing modules located on the food production station 102 and enclosed in the housing. For example, an employee may open an inspection window to access a food dispensing module 124 and refill a particular ingredient corresponding to this food dispensing module 124. In another example, a food inspector conducting a food safety inspection may open the set of inspection windows to view food dispensing modules 124 enclosed by the housing without removing these modules from the housing. The food inspector may insert a thermometer through an inspection window in order to measure the temperature of a particular ingredient.

In one variation, the housing can also include a physical ordering interface—such as in the form of a touchscreen and point-of-sale unit—configured to present menu options to users, to record food orders from users, and to collect payment information from users.

5. Control Program

The food production station 102 can be loaded with a control program configured to intake food orders from patrons and to selectively actuate the food processing and dispensing modules to construct instances of a food product according to these food orders. More specifically, the control program can be loaded onto the controller 140 and thus configured to enable the controller 140 to fulfill food orders received from patrons by selectively actuating these modules.

In one implementation, a user (e.g., technician, employee) may select a predefined control program for the specified combination of food handling modules located on the food production station 102 and load the predefined control program onto the controller 140. In another implementation, a control program can be automatically generated (e.g., by a remote computer system) and loaded onto the controller 140 based on a set of specifications input by the user, such as a list of specified ingredients, food handling modules, positions of food handling modules, and/or a specified food type that the food production station 102 is configured to assemble. In this implementation, a generic control program can be tuned according to these specifications to generate the control program. In yet another implementation, the controller 140 reads identifiers from food handling modules located in the food production station 102 and automatically configures a control program accordingly.

5.1 Completing Food Orders

The controller 140 can intake and process food orders from patrons according to the control program loaded onto the controller 140 for fulfillment of these food orders. The controller 140 can identify an assembly method for a particular food order based on characteristics of the food order and the control program. For example, the controller 140 can: receive a food order from a patron; identify a set of order characteristics (e.g., a type of food product, a set of ingredients, a timestamp indicating when the order was submitted, a predicted timestamp indicating when the order will be completed, a mode of order transmittal) corresponding to the food order; and identify a first mode of assembly for fulfillment of the food order based on the set of order characteristics, the first mode of assembly specifying a type of assembly (e.g., autonomous, manual, or a combination) for fulfillment of the food order, type of food container, the set of ingredients, a sequence (e.g., order) of assembly of the set of ingredients, and/or a delivery method. Therefore, according to the control program loaded onto the controller 140 and based on these order characteristics, the controller 140 can identify whether to assemble a particular food order via the autonomous assembly zone 120, the manual assembly zone 110, or a combination of both. In one variation, once the food order is completed, the control program can generate a notification for delivery to a patron or third-party food delivery service (e.g., via text message) indicating the food order is complete.

Additionally and/or alternatively, the controller 140 can access availability of ingredients specified in the order to identify the first mode of assembly for fulfillment of the food order. For example, the controller 140 can prioritize completion of food orders specifying ingredients that are available (e.g., or "prepped") in the food production station 102. In another example, the controller 140 can select the mode of assembly that is most likely to complete the food order by a target order completion time (e.g., as communicated to the patron corresponding to the food order), based on availability of ingredients loaded in the food production station 102.

5.1.1 Parallel Assembly

In one implementation, the manual assembly zone 110 and the autonomous assembly zone 120 can be configured by the control program to run in parallel, such that a first subset of food orders is completed by the manual assembly zone 110 and a second subset of food orders is completed by the autonomous assembly zone 120.

For example, the food production station 102 can be configured to: complete food orders received in person (e.g., verbally communicated with an employee working at the food production station 102) via the manual assembly zone 110; and complete food orders received electronically (e.g., via an online ordering portal accessible at the restaurant's website, via a native application operating on the patron's mobile phone, via a digital order interface present at the restaurant) via the autonomous assembly zone 120. In this example, the food production station 102 can be located at a restaurant and subsequently loaded with a control program configured to intake a sequence of food orders for this restaurant and assign each food order to the manual assembly zone 110 or the autonomous assembly zone 120 based on a mode of order placement (e.g., online or in person). Once loaded with this control program, the controller 140 can: receive a first food order entered by a first patron via a native application executing on her mobile device; receive a second food order, approximately concurrent to receipt of the first food order, entered by a second patron via an ordering interface within the restaurant (e.g., proximal or coupled to the food production station 102); insert the first food order within an autonomous food order queue (e.g., arranged by time received); and insert the second food order within a manual order queue (e.g., arranged by timestamp).

In another example, the control program can be configured to: assign standard food orders (e.g., food orders matched to food products identified on the restaurant's menu) to the autonomous assembly zone 120; and assign custom food orders (e.g., food orders with an ingredient substitution, a "build your own" food product) to the manual assembly zone 110.

In yet another example, the control program can be configured to default to assigning food orders via the manual assembly zone 110 and only implement the autonomous assembly zone 120 when the food order queue exhibits a high volume of food orders. In this example, the controller 140, loaded with the control program, can: receive a first food order; access a food order queue including a list of each received and incomplete food order; identify a quantity of food orders remaining in the food order queue; and, in response to the quantity of food orders exceeding a threshold quantity (e.g., 5 orders, 10 orders, 20 orders), initiate the autonomous assembly zone 120 and assign a subset of food orders in the food order queue to the autonomous assembly zone 120 for completion.

5.1.2 Assembly in Series

In one implementation, the manual assembly zone 110 and the autonomous assembly zone 120 can be configured by the control program to run in series. For example, the control program can: receive a food order; and trigger dispensation of a first set of ingredients into a food container (e.g., a bowl, a cup) by selectively actuating a sequence of food dispensing modules 124—within the autonomous assembly zone 120—according to the food order. Once the food container is loaded with the first set of ingredients, the control program can prompt an employee (e.g., via a display) to add a second set of ingredients contained in a sequence of food hoppers 114—along the manual assembly zone 110—for completion of the food order via the manual assembly zone 110. In this example, the autonomous assembly zone 120 can be loaded with the first set of ingredients including standard or base ingredients, such as rice and/or meat for a taco bowl. The manual assembly zone 110 can be loaded with a second set of ingredients including additional or premium toppings such as salsas, cheeses, grilled veggies, and/or avocado slices.

In another example, in which the manual assembly zone 110 and the autonomous assembly zone 120 are configured to run in series, the control program can default to assembling food orders via the autonomous assembly zone 120 and send these food orders to the manual assembly zone 110 for addition of particular ingredients, such as high-value ingredients (e.g., avocado slices) or ingredients that are made in real-time. More specifically, in this example, the control program can: receive a food order; extract a set of ingredients required to assemble the food order; in response to identifying a particular ingredient (e.g., a fried egg) included in the food order, flagging this particular ingredient for manual assembly zone 110; trigger dispensation of a first subset of ingredients—not including the particular ingredient—into a food container by selectively actuating a sequence of food dispensing modules 124—within the autonomous assembly zone 120—according to the food order; and, prompt an employee (e.g., via the display) to prepare and/or add the particular ingredient to the food container to complete the food order.

In yet another example, the control program can default to assembling ingredients for a food order via the autonomous assembly zone 120 and send this food order to the manual assembly zone 110 for modification and/or further processing of the ingredients to complete the food order, such as assembling vegetables, proteins, and sauces in a container via the autonomous assembly zone 120 and delivering the container to the manual assembly zone 110 for an employee to stir-fry these ingredients.

5.1.3 Dynamic Order Allocation

The system (e.g., via the controller 140) can be configured to automatically distribute food orders between the manual assembly zone 110 and the autonomous assembly zone 120 for assembling units of a food product type according to food orders. In particular, the manual assembly zone 110 and the autonomous assembly zone 120 can be configured to operate in parallel and/or in series to assemble units of the food product type, as described above. The system can then dynamically allocate assembly of food orders to the manual assembly zone 110, the autonomous assembly zone 120, or a combination of the manual and autonomous assembly zones 120 in order to: decrease duration of waiting periods for completion of food orders; increase maximum food order throughput; and decrease food waste.

5.1.3.1 Ingredient Safety & Quality

In one implementation, the controller 140 can be configured to distribute food orders between the manual assembly zone 110 and the autonomous assembly zone 120 based on shelf life of ingredients loaded within the food production station 102.

For example, for each ingredient loaded within the food production station 102, the controller 140 can: access a loading time corresponding to initial loading of the ingredient in the food production station 102; access a safety duration corresponding to a maximum duration of time the ingredient can be safely stored in a food hopper loaded on the food production station 102 (e.g., before the ingredient is unsafe for consumption); and calculate a replacement time for the ingredient based on the initial time and the safety duration. Then, in response to a current time falling within a threshold duration (e.g., 10 minutes, 30 minutes, 1 hour) of a first replacement time for a first ingredient loaded in the food production station 102, the controller 140 can: access a food order queue including a set of food orders received from patrons; identify a first subset of food orders, in the set of food orders, specifying the first ingredient; and identify a second subset of food orders, in the set of food orders, excluding the first ingredient. The controller 140 can then: allocate the first subset of food orders for assembly via the autonomous assembly zone 120 based on a first order completion rate associated with assembly of food orders via the autonomous assembly zone 120; and allocate the second subset of food orders for assembly via the manual assembly zone 110 based on a second order completion rate, less than the first order completion rate, associated with assembly of food orders via the autonomous assembly zone 120. Therefore, the controller 140 can direct food orders containing the first ingredient to the autonomous assembly zone 120 to increase a quantity of food orders assembled—and loaded with the first ingredient—prior to expiration of the safety duration for this first ingredient, thereby decreasing food waste and maximizing food order throughput.

Alternatively, in the preceding example, the controller 140 can: allocate the first subset of food orders for assembly via the manual assembly zone 110 based on first dispensed amount per order—defining an average amount of the first ingredient manually dispensed per food order containing the first ingredient—corresponding to manual dispensation of the first ingredient (e.g., by human operators); and allocate the second subset of food orders for assembly via the autonomous assembly zone 120 based on a second dispensed amount per order—defining an amount of the first ingredient automatically dispensed per food order containing the first ingredient—less than the first dispensed amount per order, and corresponding to automatic dispensation of the first ingredient (e.g., by the sequence of food dispensing modules 124). Therefore, the controller 140 can direct food orders containing the first ingredient to the manual assembly zone 110 to promote dispensation of the first ingredient at the first dispensed amount per order, thereby enabling faster consumption of a remaining amount of the first ingredient and decreasing food waste.

Additionally and/or alternatively, in another example, the controller 140 can access a quality duration corresponding to a maximum duration of time the ingredient can be stored in a food hopper loaded on the food production station 102 before a quality of the ingredient falls below a threshold quality. The controller 140 can then similarly direct food orders between the autonomous assembly zone 120 and the manual assembly zone 110 based on the quality duration of each ingredient.

5.1.3.2 Ingredient Availability

In another implementation, the controller 140 can distribute food orders between the manual assembly zone 110 and the autonomous assembly zone 120 based on availability of ingredients loaded within the food production station 102.

In one example, the controller 140 can be configured to distribute food orders containing ingredients exhibiting low ingredient levels (e.g., below a threshold ingredient level) to the autonomous assembly zone 120 for automatic assembly. In particular, due to greater variance in amounts of ingredients dispensed manually (e.g., by a human operator) versus amount of ingredients dispensed automatically (e.g., via the sequence of dispensing modules), the controller 140 can route these food orders to the autonomous assembly zone 120 to: limit the amount of ingredients dispensed per food order; and more accurately predict when ingredients will need replenishing. For example, for each ingredient, in a set of ingredients, loaded within the food production station 102, the controller 140 can: access a food order queue including a set of food orders; and access a current ingredient level recorded by a set of sensors 170 coupled to the sequence of food hoppers 114 loaded with the set of ingredients. Then, in response to a first current ingredient level of a first ingredient, in the set of ingredients, falling below a threshold ingredient level (e.g., defined by the first ingredient), the controller 140 can: identify a first subset of food orders, in the first set of food orders, containing the first ingredient; and allocate the first subset of food orders for automatic assembly via the autonomous assembly zone 120 in order to extend a duration between measuring the current ingredient level and a future predicted time at which the first ingredient will be empty.

6. Food Production Record

The controller can be configured to track a timeseries of food production data to assemble a food production record (or "food record") for the food production station 102.

In one implementation, the controller can be configured to: receive a set of food orders; coordinate motion of the conveyor and selectively trigger the sequence of food dispensing modules to dispense volumes of ingredients into food containers to assemble food products according to the set of food orders; track timeseries of amounts of ingredients stored within the sequence of food hoppers (e.g., recorded via a set of sensors 170 installed on the food production station); generate a set of food records corresponding to food orders based on the timeseries of amounts of ingredients; and link food records to corresponding food orders. The controller can then compile these food records—linked to specific food orders—in a food production record associated with the food production station.

For example, during a particular time period, the controller 140 can record a timeseries of food production data including: a timeseries of ingredient data including dispensed amounts of ingredients loaded on the food production station 102; a timeseries of food prep data including durations of time spent prepping ingredients for loading on the food production station 102; a timeseries of food waste data including wasted amounts of ingredients loaded on the food production station 102; a timeseries of food order data including quantities of types of food orders received; a timeseries of labor data including a quantity of workers (e.g., associated with the food production station 102) assigned to various tasks; etc.

The controller 140 can then transmit this timeseries of food production data to a computer system (e.g., a local or remote server) for assembly of a record for the particular time period. The remote computer system can then leverage this record to extract insights related to efficiency of the food production station 102 during the particular time period. Further, the computer system can leverage the record to predict future operations at the food production station, such as future food orders received, amounts of ingredients dispensed, times to complete food orders (e.g., in a food order queue), etc.

6.1.1 Ingredient Record

In one implementation, the system can be configured to track a timeseries of ingredient data to assemble an ingredient record for the food production station 102.

For example, the controller 140 can be configured to continuously, semi-continuously, and/or periodically (e.g., each time an ingredient is dispensed, every minute, every five minutes, every thirty minutes) read ingredient level data recorded by the set of sensors 170 installed in the manual assembly zone 110 and the autonomous assembly zone 120 of the food production station 102. The controller 140 can then timestamp this ingredient level data recorded by the set of sensors 170 to generate a timeseries of ingredient data for each ingredient loaded in the food production station 102. The controller 140 can then transmit this timeseries of ingredient data to a computer system (e.g., a remote computer system, a local or remote server) for extraction of insights from the timeseries of ingredient data and assembly of an ingredient record.

In one example, the system can be configured to assemble an ingredient record for a particular ingredient transiently loaded within the food production station 102 over a first period of time. In this example, the controller 140 can identify a subset of food orders, in a set of food orders, specifying a particular ingredient. Then, for each food order, in the subset of food orders, the system can: record a dispensed amount of the first ingredient for assembling the food order; record a time value (e.g., a timestamp) corresponding to dispensation of the dispensed amount; and repeat this process for each food order, in the subset of food orders, to generate a timeseries of ingredient data representing dispensed amounts of the first ingredient over the first period of time.

For example, in response to dispensing the first ingredient at a first time, within the first period of time, for assembly of a first food order, in the set of food orders, the controller 140 can: record a first dispensed amount of the first ingredient; record a first time value (e.g., timestamp) corresponding to the first time; and assemble a first dispensation record for the first ingredient including the first time value and the first dispensed amount. Later, in response to dispensing the first ingredient at a second time, within the first period of time, for assembly of a second food order, in the set of food orders, the controller 140 can: record a second dispensed amount of the first ingredient; record a second time value (e.g., timestamp) corresponding to the second time; and assemble a second dispensation record for the first ingredient including the second time value and the second dispensed amount. Finally, in response to dispensing the first ingredient at a third time, within the first period of time, for assembly of a third food order, in the set of food orders, the controller 140 can: record a third dispensed amount of the first ingredient; record a third time value (e.g., timestamp) corresponding to the second time; and assemble a third dispensation record for the first ingredient including the third time value and the third dispensed amount.

The controller 140 can then generate a first timeseries of ingredient data for the first ingredient based on the first, second, and third dispensation records. Based on this first timeseries of ingredient data, the system can: calculate an average dispense rate—defining an amount of the first ingredient dispensed per food order—for the first ingredient during the first period of time based on the first, second, and third dispensed amounts; calculate an average variance based on the first, second, and third dispensed amounts and the average dispense rate; and/or derive a dispensation curve representative of changes in dispense rate (e.g., amount of the ingredient dispensed per food order) over time. The system can then generate an ingredient record for the first ingredient including: the first timeseries of ingredient data; the average dispense rate; the average variance; and/or the dispensation curve.

Additionally and/or alternatively, the system can be configured to assemble an ingredient record for: a particular ingredient in a particular food product; an ingredient dispensed via the autonomous assembly zone 120; an ingredient dispensed via the manual assembly zone 110; an ingredient dispensed by a particular operator; etc. For example, the system can assemble a first ingredient record for a first ingredient (e.g., based on all food orders including this ingredient) including: a total dispense rate—defining an amount of the first ingredient dispensed per food order containing the first ingredient—for the first ingredient during a particular period of time; a salad dispense rate—defining an amount of the first ingredient dispensed per salad order containing the first ingredient; a rice bowl dispense rate—defining an amount of the first ingredient dispensed per rice bowl order containing the first ingredient; a wrap dispense rate—defining an amount of the first ingredient dispensed per wrap order containing the first ingredient; a manual dispense rate—defining an amount of the first ingredient dispensed per food order containing the first ingredient and assembled via the manual assembly zone 110; an automatic dispense rate—defining an amount of the first ingredient dispensed per food order containing the first ingredient and assembled via the autonomous assembly zone 120; and/or an operator-specific dispense rate—defining an amount of the first ingredient manually dispensed, by a particular operator, per food order containing the first ingredient.

6.1.1 Dispensation Curve

In one implementation, the system can be configured to collect ingredient data from the food production station 102 during a particular time period to generate a timeseries of ingredient data—including dispensed amounts of ingredients—during the particular time period. The system can then leverage this timeseries of ingredient data to derive a dispensation curve for ingredients loaded in the food production station 102 during the particular time period.

For example, during an initial period for the food production station 102, the controller 140 can: access an initial ingredient level of a first ingredient—loaded in a hopper within the food production station 102—recorded by a sensor coupled to the hopper at an initial time; access a first ingredient level of the first ingredient recorded by the sensor at a first time succeeding the initial time by a first duration; access a second ingredient level of the first ingredient recorded by the sensor at a second time succeeding the first time by a second duration; and access a third ingredient level of the first ingredient recorded by the sensor at a third time succeeding the second time by a third duration. The system can then calculate: a first dispensed amount of the first ingredient during the first duration based on the initial ingredient level and the first ingredient level; a second dispensed amount of the first ingredient during the second duration based on the first ingredient level and the second ingredient level; and a third dispensed amount of the first ingredient during the third duration based on the second ingredient level and the third ingredient level. The system can then leverage the first, second, and third dispensed amounts of the first ingredient to generate a dispensation curve representative of changes in dispensed amounts (e.g., or "dispense rate") of the first ingredient over time (e.g., during the initial period). In this example, the system can repeat this process for each available ingredient to generate a set of dispensation curves for the food production station 102.

Additionally and/or alternatively, the system can derive a dispensation curve for: a particular ingredient (e.g., across all food product types); ingredients in a particular food product type; ingredients dispensed by a particular operator (e.g., worker); ingredients dispensed at a particular time of day (e.g., morning, midday, evening, weekday, weekend); ingredients dispensed by the set of food dispensing modules 124 of the autonomous assembly zone 120; ingredients manually dispensed by a human operator via the manual assembly zone 110; etc.

6.1.2 Food Order Record

Additionally and/or alternatively, in another implementation, the system can be configured to track a timeseries of food order data to assemble a food order record for the food production station 102.

In one example, the system can be configured to assemble a food order record for a particular food order type (e.g., salad, bowl, wrap, smoothie, beverage). In this example, for each food order of the particular food order type, the system can: record an initial time value corresponding to initial receipt of the food order; record dispensed amounts and corresponding time values for each ingredient dispensed during assembly of the food order; and record a final time value corresponding to completion of the food order.

For example, in response to receiving a first food order of a first food product type at a first time, the controller 140 can: record a first time value (e.g., timestamp) corresponding to the first time; and record a first dispensed amount of a first ingredient in a set of ingredients associated with the food orders of the first food product type; record a first time value corresponding to dispensation of the first ingredient; record a second dispensed amount of a second ingredient in the set of ingredients; record a second time value corresponding to dispensation of the second ingredient; record a third dispensed amount of a third ingredient in the set of ingredients; record a third time value corresponding to dispensation of the third ingredient; and, in response to completing assembly of the first food order at a final time, record a final time value corresponding to the final time. Further, the controller 140 can repeat this process for each food order of the first food product type (e.g., received within a particular period of time).

The controller 140 can then generate a timeseries of food order data based on the recorded time values and dispensed amounts of ingredients, in the set of ingredients, for food orders of the first food product type. Based on this timeseries of food order data, the system can: calculate an average dispense rate—defining an amount of the first ingredient dispensed per food order—for each ingredient in the set of ingredients; calculate a set of dispense durations—defining a duration between dispensation of ingredients in the set of ingredients—for food orders of the first food product type; calculate an average assembly duration—defining an average duration of assembly of food orders of the first food product type—based on initial and final time values of food orders of the first food product type; and/or calculate an average quantity of food orders of the first food product type assembled within a particular period of time. The system can then generate a food order record for food orders of the first food product type including: the first timeseries of food order data; the average dispense rate for each ingredient in the set of ingredients; the average variance for each ingredient in the set of ingredients; the average assembly duration; and/or the average quantity of food orders of the first food product type assembled within the particular period of time. The system can similarly assemble food order records for: food orders assembled via the autonomous assembly zone 120; food orders assembled via the manual assembly zone 110; food orders of a particular food product type and assembled via the autonomous assembly zone 120; food orders of a particular food product type and assembled via the manual assembly zone 110; food orders assembled by a particular operator; etc.

6.1.4 Model

Over time, the system can identify a set of controls (e.g., time-based controls, environmental controls, food order controls) that may be indicative of ingredient dispense rates (e.g., amount dispensed per order, amount dispensed within a particular period of time). The system can then leverage these controls to: predict future ingredient dispense rates and/or ingredient levels; and to suggest operating procedures based on these predicted dispense rates and the set of controls.

For example, during an initial period of time, the controller can: track a timeseries of amounts of ingredients stored within a food hopper loaded on the food production station; and track a first timeseries of control data corresponding to a set of controls, such as quantities of food orders in the food order queue, quantities of workers present at the food production station and/or cooking food (e.g., in a kitchen associated with the food production station), weather patterns (e.g., warm weather, cold weather, raining, snowing), type of day (e.g., day of week, weekday or weekend, holiday), etc. The controller can then derive a dispense model linking ingredient amounts (e.g., amounts of ingredients dispensed or consumed) to the set of controls for this particular food production station. The controller can then leverage this dispense model to: predict future amounts of ingredients dispensed over a particular period of time based on known and/or predicted controls; and suggest operating procedures based on these predicted ingredient amounts. For example, the controller can predict: amounts of ingredients to prep for a particular period of time; amounts of ingredients to maintain in stock for a particular period of time; a quantity of workers needed for a particular period of time; times that ingredients loaded in the food production station will be empty; etc.

6.2 Food Production Record: Manager

The remote computer system can transmit this record to an administrator (e.g., a manager) associated with the food production station for reviewing efficiency of food production at the food production station during the particular time period. The administrator and/or remote computer system can then leverage this record to inform operations (e.g., ingredient distribution, ingredient prep, labor distribution) at the food production station during a future time period. Therefore, the modular system can enable the administrator to: monitor performance of the food production station remotely (e.g., offsite); minimize losses due to food waste (e.g., due to overstocking ingredients or over-prepping ingredients); minimize losses due to low food order throughput (e.g., due to long wait times for food orders and/or insufficient ingredient availability); and maximize food order throughput by providing suggestions for labor allocation, food order allocation (e.g., via autonomous or manual assembly), amounts of ingredients to prep, times to prep ingredients, etc.

6.3. Food Production Record: Customer

In one implementation, the system can track a timeseries of food order data to assemble a food order record for a particular food order submitted by a patron. The system can then leverage this food order record to provide real-time updates to the patron regarding the status of the particular food order.

For example, in response to receiving a first food order submitted by a patron at a first time, the system can: record an initial time value corresponding to the first time; access a food order queue comprising a set of food orders submitted by patrons; estimate a target completion time based on the initial time, the first food order, and the food order queue; generate a first notification indicating the target completion time; and transmit the first notification to the patron (e.g., via her mobile device).

The system can then: insert the first food order into the food order queue; and allocate the first food order to the manual assembly zone 110 or the autonomous assembly zone 120 for manual or automatic assembly of the first food order (e.g., based on ingredients needed for assembling the first food order, based on the target completion time). Upon allocating the first food order to the manual assembly zone 110 or the autonomous assembly zone 120, the system can: calculate a predicted completion time for assembly of the first food order via the corresponding assembly zone (e.g., autonomous assembly zone 120 or manual assembly zone 110); generate a second notification indicating the predicted completion time; and transmit the second notification to the patron.

Further, during assembly of the first food order, the system can record each ingredient dispensed into a corresponding food container. In particular, the system can confirm dispensation of each ingredient specified by the first food order based on changes to ingredient levels recorded by the set of sensors 170 coupled to the sequence of food hoppers 114. Based on detected changes to ingredient levels for these ingredients, the system can thus confirm that the resulting unit of the food product type contains each ingredient specified by the first food order. The system can then generate a list of these ingredients (e.g., such as by updating the list each time an ingredient is added to the corresponding food container) for presenting to the patron, such as via a sticker affixed to the container or via a notification transmitted to the patron (e.g., via her mobile device).

7. Food Prep Scheduling

The modular system 100 can include a food prep scheduler configured to enable timely fulfillment of food orders with minimal food waste and minimal error. In particular, the scheduler can be configured to: collect real-time data on inventory of ingredients (e.g., located within food hoppers on the food production station 102, previously prepped for food assembly, in storage external the food production station 102) and demand for these ingredients (e.g., based on food orders received); extract insights into food prep efficiency; output real-time estimates of ingredient inventory and times when ingredients will require replenishing in food hoppers located on the food production station 102; and, over time, develop a model for daily food prep to maximize food order throughput, maximize, food order accuracy, and/or minimize food waste generated.

For example, the food prep scheduler can receive and store: a list of food orders available on a menu; a list of ingredients available on the menu; a quantity of each ingredient required for each food order; and a location of each ingredient within the food production station 102 (e.g., within the manual assembly zone 110 and the autonomous assembly zone 120). Based on this information, the food prep scheduler can identify a quantity of ingredients required to complete food orders in the food order queue and/or methods (e.g., food prep practices) for accurate and timely completion of these food orders.

Furthermore, the food prep scheduler can predict future food orders (e.g., not in the food order queue) to estimate ingredient usage and best practices for completion of orders within a work period. For example, the food prep scheduler can receive and store: a backlog of food orders produced by the food production station 102 sorted by timestamp (e.g., date and time); historical records (e.g., food production records) of food orders produced by the food production station 102 sorted by timestamp; a sales forecast (e.g., entered by a human operator, entered by a software algorithm); food hopper volumes on the food production station 102; food storage container volumes (e.g., containers used to store prepped food external the food production station 102); a density of each ingredient; an inventory of prepped ingredients at a start of a working period; inventory of available ingredients at a start of the working period; an average duration (or "prep duration") corresponding to an average time required to prep a particular quantity of an ingredient; an average duration (or "refill duration") corresponding to an average time required to refill a food hopper with a particular quantity of an ingredient; an average duration (or "order duration") corresponding to an average time required to complete assembly of a particular type of food order; a quantity of food runners (e.g., operators, workers) available during the working period; etc. The food prep scheduler can therefore leverage this information to minimize ingredient waste and increase efficiency of food assembly by minimizing waiting periods for completion of food orders and increasing accuracy of food orders (e.g., by keeping ingredients stocked).

7.1 Daily Food Prep

The food prep scheduler can: estimate a quantity (or "prep quantity") of an ingredient specified across food orders inbound within a future time window (e.g., one day); and schedule loading of hoppers and food dispensing modules 124 in the food production station 102 with these ingredient quantities in preparation for these time windows in order to enable timely fulfillment of these predicted food orders with minimal food waste (i.e., loaded ingredient quantities not dispensed within defined food handing durations) and with minimal down time to reload these hoppers and food dispensing modules 124 during this time window. The food prep scheduler can specify this prep quantity (e.g., via the kitchen display 160) to a user (e.g., an employee) responsible for preparing this ingredient (e.g., slicing, thawing, heating ingredients). Additionally, the food prep scheduler can be configured to present scheduling information (i.e., the prep quantity) across multiple kitchen displays 160 (e.g., distributed about or near a kitchen of a restaurant) and/or to mobile devices of workers (e.g., via a native application associated with the prep scheduler).

For example, the food prep scheduler can: identify a quantity of a first ingredient dispensed per food order including the first ingredient (e.g., based on stored food records including the first ingredient); identify an average quantity of food orders received within a work period (e.g., daily, over a 2-hour window corresponding to lunch) specifying the first ingredient; and estimate a prep quantity of the first ingredient needed for this work period based on the quantity dispensed per food order and the average quantity of food orders specifying the first ingredient.

Furthermore, in the previous example, the food prep scheduler can identify: a waste quantity of the first ingredient at the end of the work period; and/or a shortage quantity corresponding to an additional amount of the first ingredient requiring preparation throughout the work period. The food prep scheduler can then adjust the prep quantity of the first ingredient for future work periods based on the waste quantity and/or shortage quantity.

For example, during a setup period preceding a first time period, the prep scheduler can estimate a predicted amount of each ingredient dispensed for assembly of food orders during the first time period, such as based on a food production record stored for the food production station. Then, for each ingredient, in response to termination of the first time period, the prep scheduler can: access a first actual amount of the ingredient dispensed for assembling food orders during the first period of time; characterize a difference between the predicted amount and the actual amount; and store this difference in the food production record. Later, during a next setup period, the prep scheduler can leverage this difference and the food production record to estimate a new predicted amount of each ingredient for dispensation during a third period of time succeeding the second period of time.

7.1.1 Ingredient Arrangement

The food prep scheduler can also schedule a particular combination and/or arrangement of ingredients for loading within the food production station during a future time window (e.g., one day, a particular shift within a day). In particular, the food prep scheduler can: estimate a predicted food order queue (e.g., including predicted inbound food orders) for the future time window; and estimate a particular arrangement of food hoppers loaded with ingredients for loading on the food production station. The food prep scheduler can then specify this particular arrangement (e.g., via the makeline interface 150 and/or kitchen display 160) to a user (e.g., a worker) responsible for loading ingredients into food hoppers and loading food hoppers into receptacle of the food production station.

For example, the food prep scheduler can access a food production record associated with the food production station and corresponding to a preceding period of time, and, based on the food production record, estimate: a quantity of food orders inbound within the future time window; a quantity of each type of food order (e.g., salad, bowl, wrap) inbound within the future time window; a quantity of each ingredient dispensed during the future time window; etc. The food prep scheduler can then leverage these predictions—and the food production record—to assemble a first configuration of food hoppers, each food hopper loaded with a particular ingredient, for the future time window, in order to enable timely fulfillment of predicted food orders with minimal down time between dispensation of ingredients (e.g., in the manual and autonomous assembly zones) and minimal down time to reload food hoppers 114 and/or food dispensing modules 124 during this future time window.

7.2 Ingredient Replenishment

Furthermore, the food prep scheduler can: access the set of sensors 170 on the food production station 102 to estimate a quantity of the first ingredient remaining within a food hopper on the food production station 102. Then, in response to an estimated quantity needed of this first ingredient (e.g., based on received and/or predicted food orders) exceeding the quantity remaining within the food hopper, the scheduler can prompt an employee (e.g., via the kitchen display 160) to refill the food hopper with the first ingredient.

The food prep scheduler can estimate a time window within which a particular ingredient will need refilling based on the current fill level of this ingredient and/or predicted demand for this ingredient. The food prep scheduler can schedule loading of a food hopper on the food production station 102 with the particular ingredient at a particular time within the time window in order to enable timely fulfillment of food orders requiring this ingredient with minimal food waste.

In one implementation, the food prep scheduler can provide (e.g., via the kitchen display 160) a list of ingredients ordered by approximate time windows during which each ingredient will require refilling by an employee. The food prep scheduler can therefore prioritize refilling of ingredients based on predicted demand for these ingredients within a particular time window and/or based on food orders specifying these ingredients within the food order queue.

7.2.1 Food Quality and Safety

The food prep scheduler can be configured to implement food prep practices that promote food quality and food safety while minimizing waste. For example, for each ingredient available on a menu, the food prep scheduler can: store a quality duration corresponding to a maximum duration of time that each ingredient can be stored after prepping (e.g., after searing chicken, after slicing vegetables) and before quality of this ingredient falls below a threshold quality; and a safety duration corresponding to a maximum duration of time each ingredient can be stored after prepping before this ingredient is unsafe to consume. The food prep scheduler can therefore track times at which each food hopper is filled in order to track ingredient quality over time. Then, in response to detecting a quality below a threshold quality for a particular ingredient (e.g., based on the safety duration of this particular ingredient), the prep scheduler can notify (e.g., via the kitchen display 160) an employee to immediately empty this particular ingredient from the food hopper and refill the food hopper with a fresh batch of this particular ingredient.

The food prep scheduler can also track a quantity of the particular discarded ingredient and leverage this information to inform future prepping and loading of this ingredient in order to reduce waste. In the example above, if the food hopper was initially filled to a first level with the first ingredient, the food prep scheduler can schedule an employee to prep and fill the food hopper to a second level less than the first level with the first ingredient the following day.

8. Variation: Analog Line Only

In one variation, the food production station 102 includes only the manual assembly zone 110. In replacement of the autonomous assembly zone 120, the food production station 102 can include a sequence of housings beneath the food prep surface 112 configured to store additional ingredients and/or food preparation materials (e.g., food containers, serving utensils, cleaning supplies). The modular system 100 can include the food prep scheduler as described above. Therefore, the food production station 102 can include a set of temperature and weight sensors to monitor ingredients stored within the food production station 102. Additionally and/or alternatively, the food production station 102 can include a set of depth sensors located above the sequence of food hoppers 114 on the food prep surface 112 and configured to track quantities of ingredients dispensed (e.g., by an employee) and/or quantities of ingredients remaining in food hoppers.

In this variation, the food prep scheduler can be configured to monitor food assembly practices of an employee in order to maximize food order output and minimize food waste and cost (e.g., due to wasted ingredients, due to overfilling food orders, due to incorrect food orders). For example, the food prep scheduler can access a set of depth sensors located above the sequence of food hoppers 114 along the food production station 102 to record an amount of a particular ingredient dispensed by the employee each time the employee assembles a food order specifying this particular ingredient during a work period. Over time, the food prep scheduler can characterize an amount (e.g., an average amount) that this employee dispenses of this particular ingredient per food order and a variance of the employee's dispensation of this particular ingredient. Then, during the following work period, the food prep scheduler can: access the set of sensors 170 in order to measure a quantity remaining of the particular ingredient in a food hopper; and predict a quantity of food orders that this employee can complete based on the quantity remaining. Furthermore, the food prep scheduler can prompt the employee (e.g., via the kitchen display 160) to adjust a quantity dispensed of this particular ingredient if the employee is adding too much or too little of the particular ingredient to food orders. Therefore, the food prep scheduler can "on the fly" retrain the employee to dispense a particular quantity of this ingredient and within a threshold variance.

9. Food Establishment Layout

The modular system 100 can be integrated into a food establishment (e.g., restaurant, grocery store, food court, bar, cafeteria) to intake and process food orders from patrons at this food establishment.

For example, an instance of the food production station 102 can be located in a restaurant (e.g., a fast-casual restaurant). This instance of the food production station 102 can be located within the restaurant such that a customer facing façade—including an ordering interface—faces a "front of house" of the restaurant, accessible to patrons, and the manual and autonomous assembly zone 120s face a kitchen of the restaurant, accessible to employees of the restaurant. In this example, a customer may place her food order either online (e.g., via a native application executing on her mobile device) or at the restaurant (e.g., via an ordering interface, via interaction with a restaurant employee).

Figure 6:
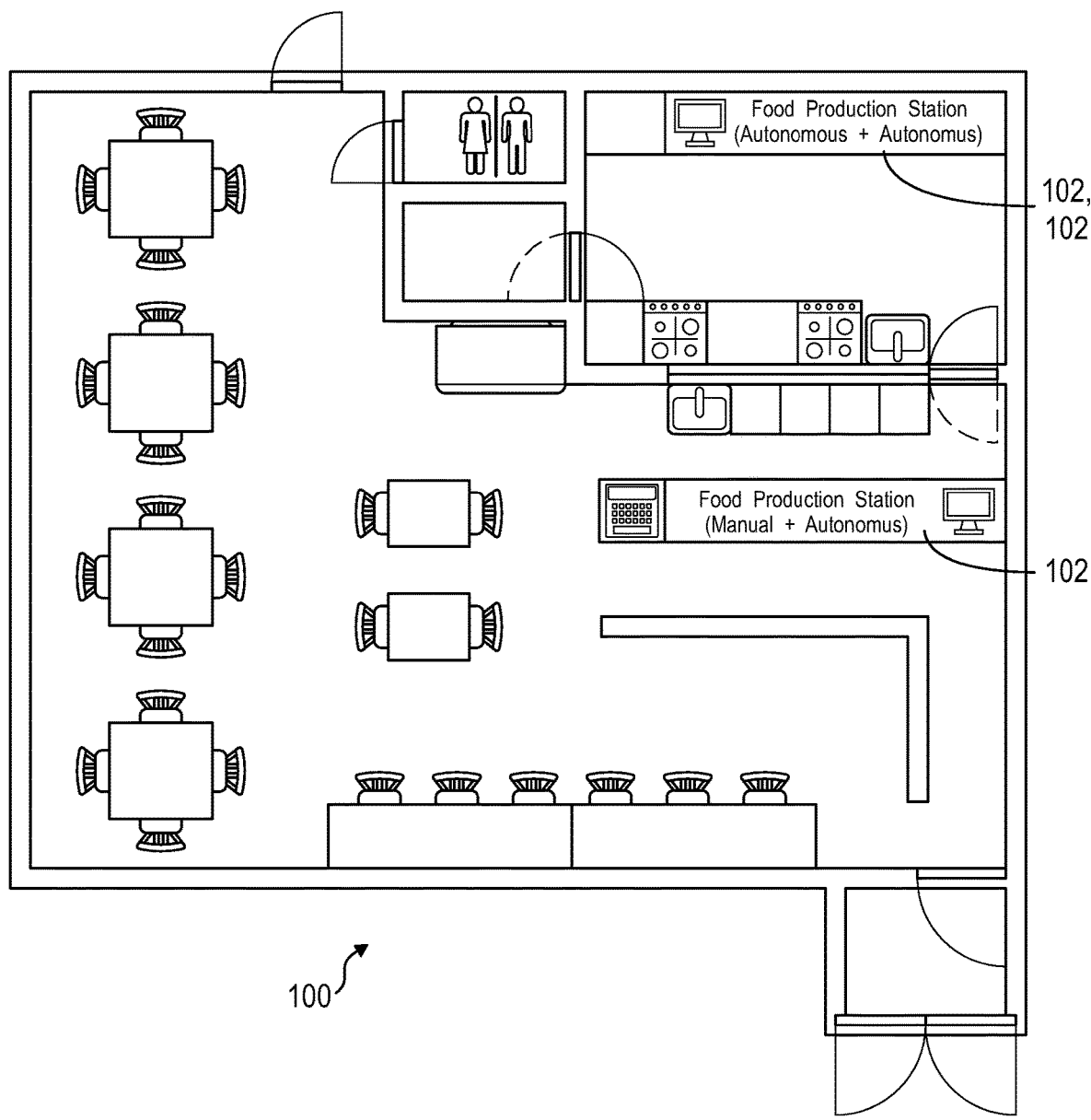
FIG. 6 is a schematic representation of the system.
Figure 8:
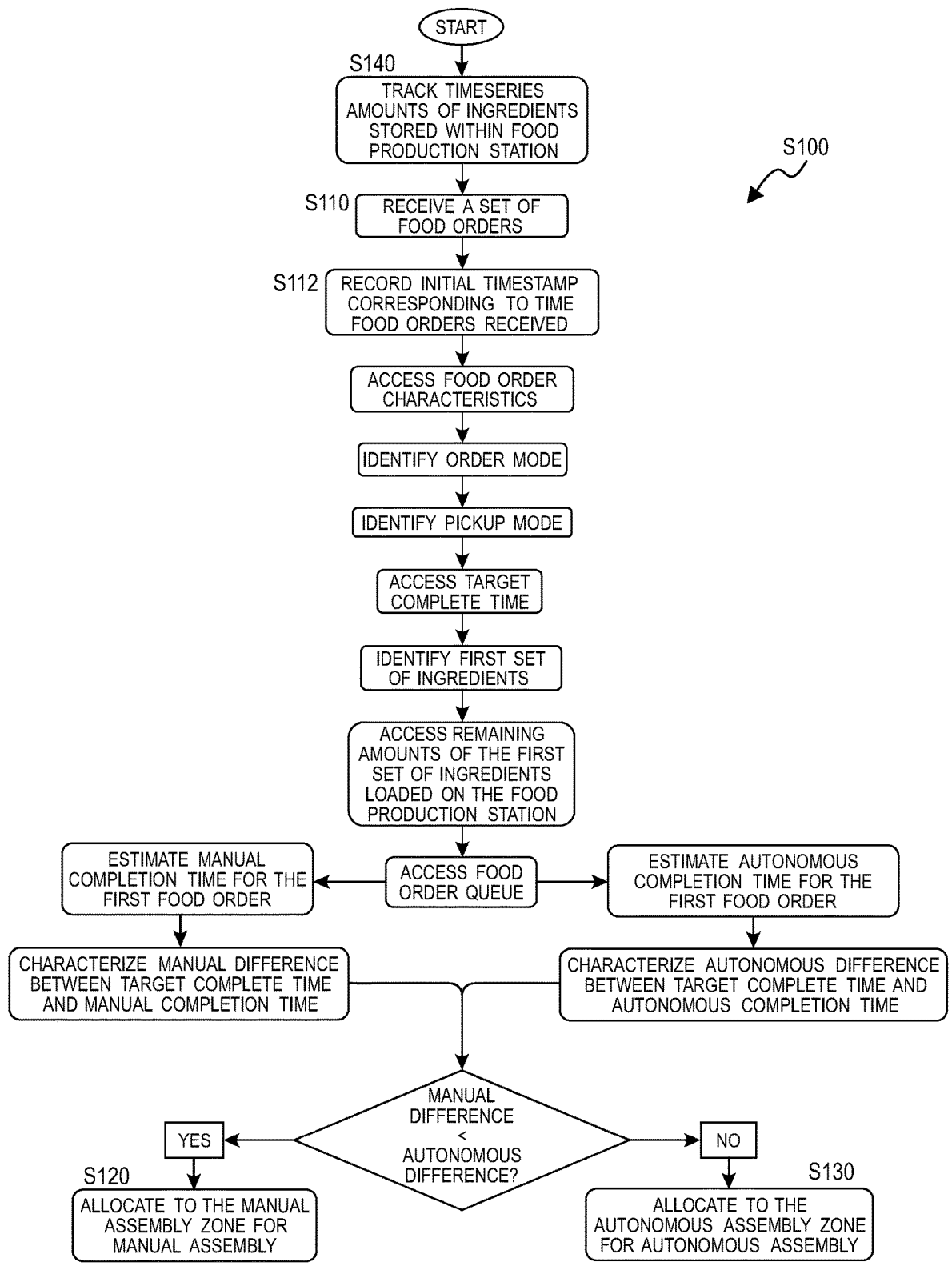
FIG. 8 is a flowchart representation of the method.
Figure 9A:
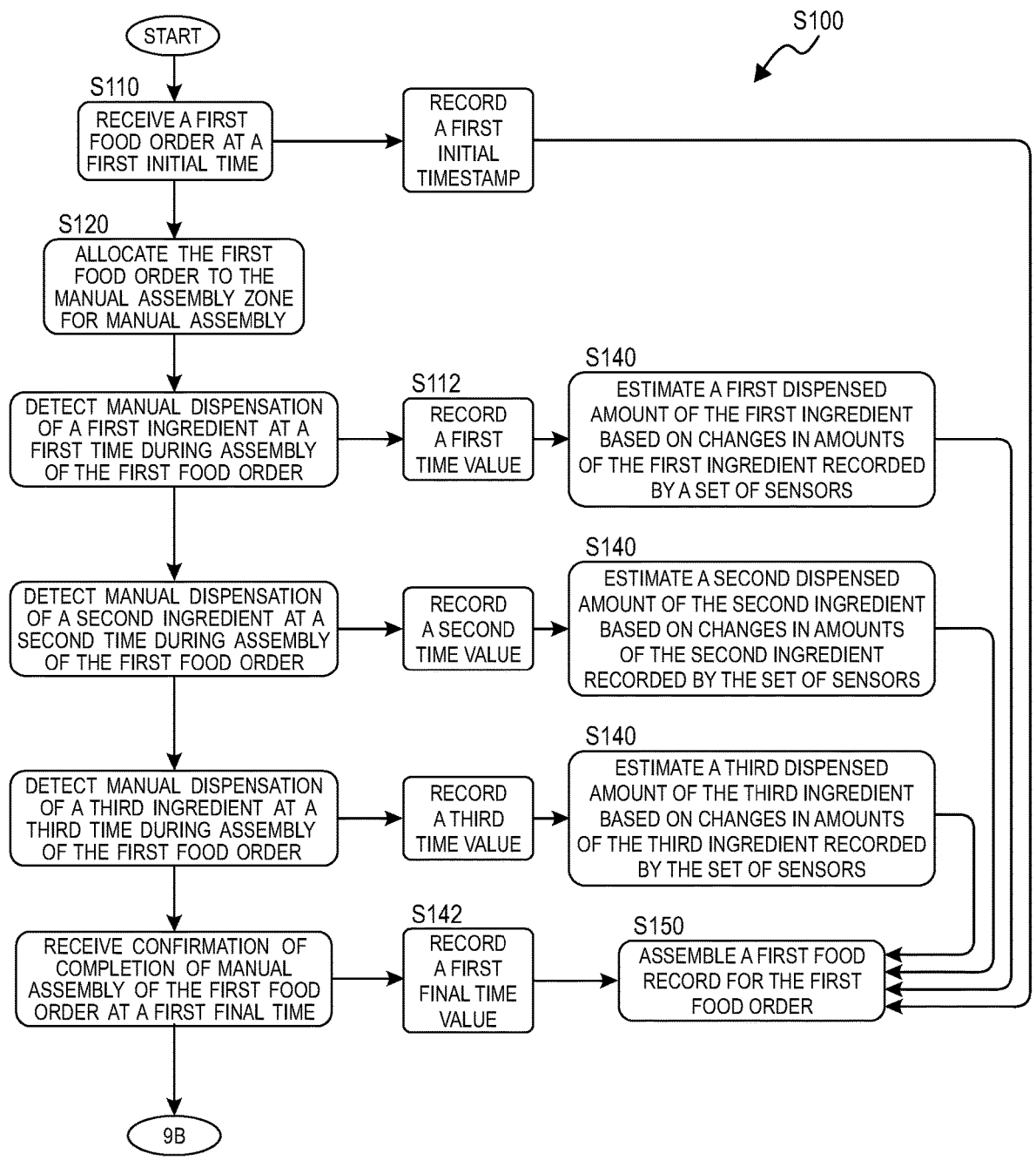
FIGS. 9A and 9B are flowchart representations of the method.
Figure 9B:
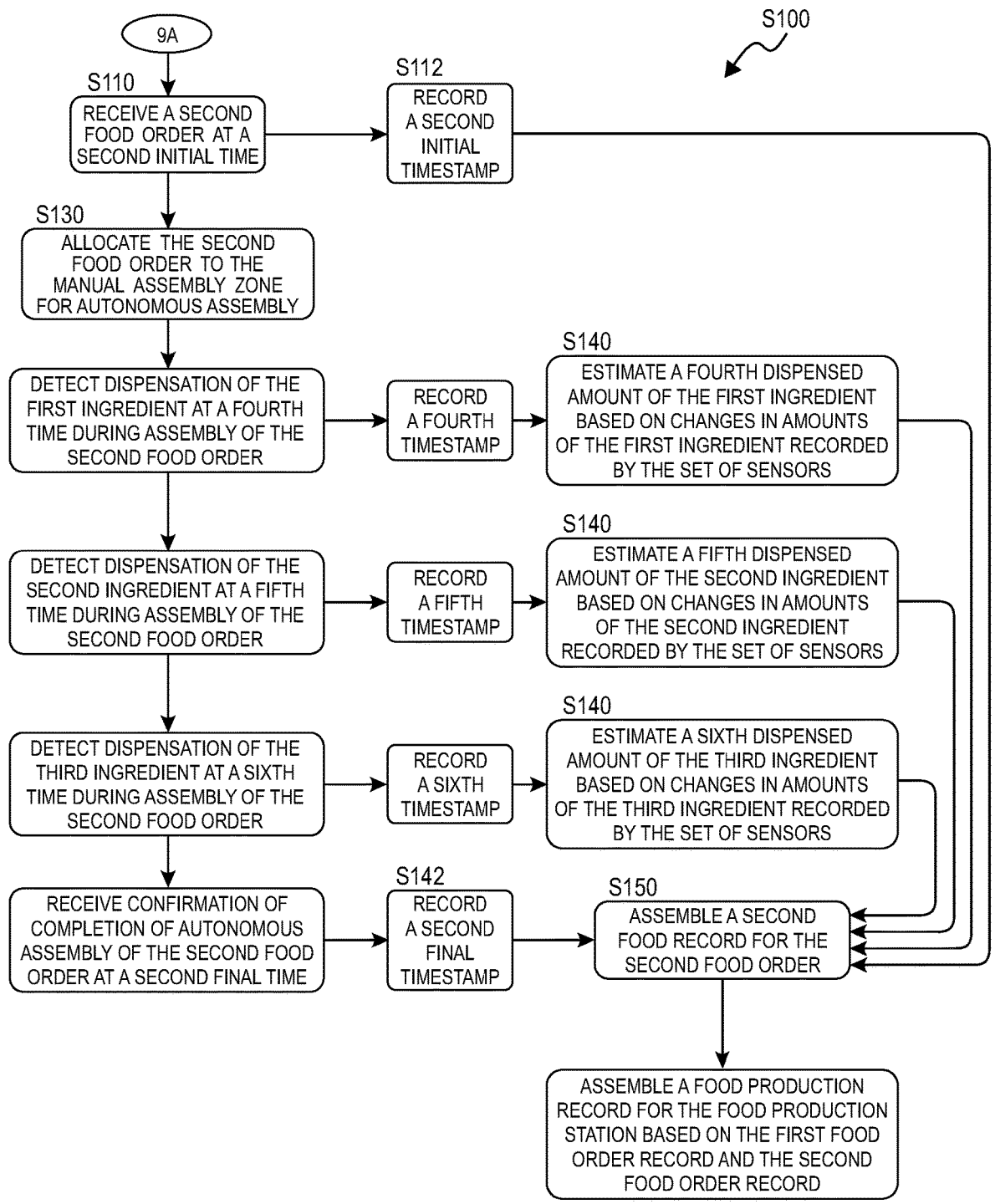
Figure 10A:
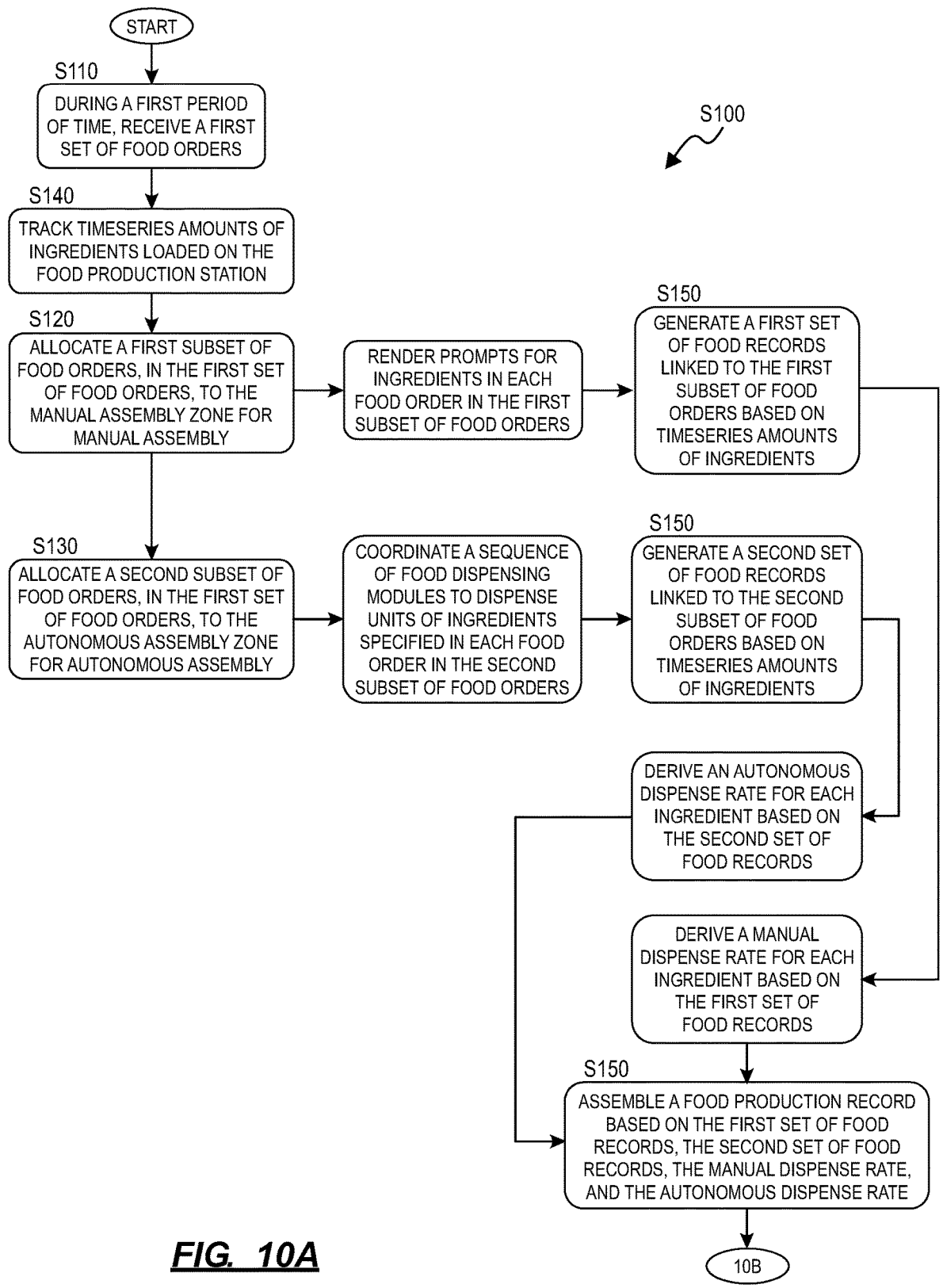
FIGS. 10A and 10B are flowchart representations of the method.
Figure 10B:
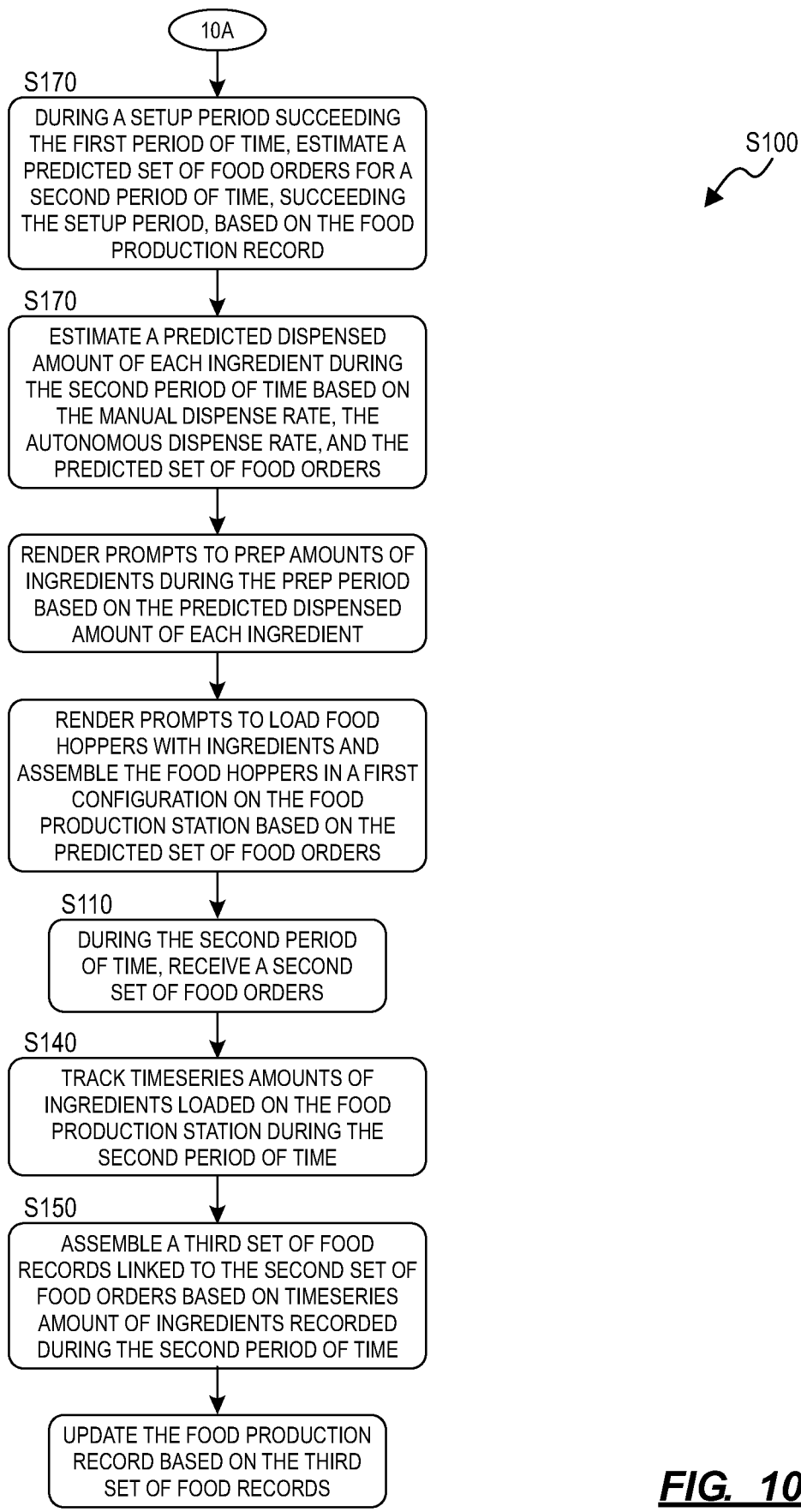
Figure 11:
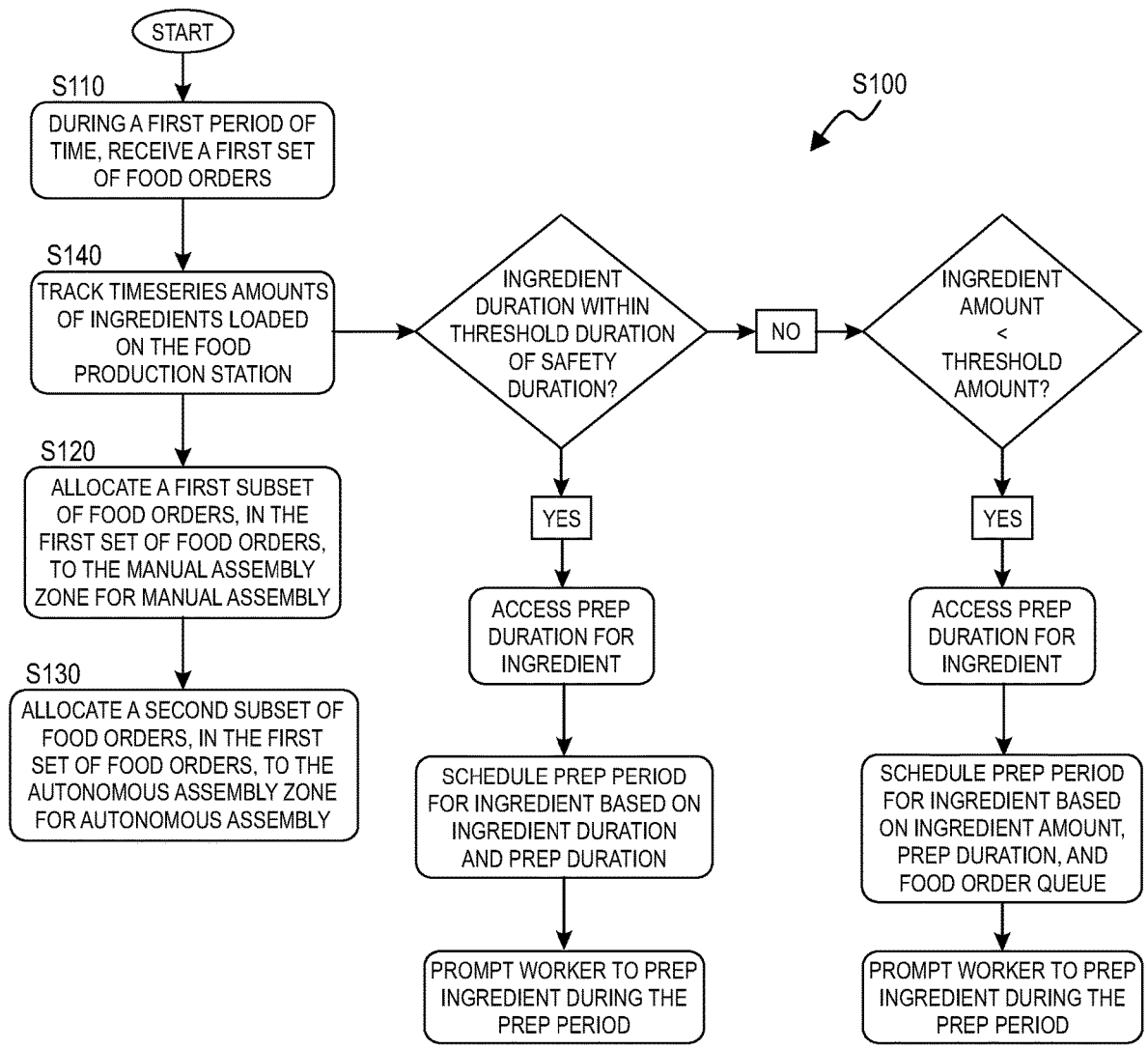
FIG. 11 is a flowchart representation of the method.

In one implementation, as shown in FIG. 6, the modular system 100 can include multiple instances of the food production station 102 located within a food establishment. For example, a restaurant may install a first instance of the food production station 102 in the front of house, proximal the kitchen, and a second instance of the food production station 102 in the kitchen. The control program loaded onto a controller 140 of each food production station 102 can be configured to selectively distribute food orders received from patrons between the first and second instance of the food production station 102 to increase maximum food order throughput per unit floor area of the restaurant (or "efficiency" of food order completion at the restaurant).

In one implementation, instances of the food production station 102 can be configured to install in vertical stacks. For example, the modular system 100 can include a first instance of the food production station 102 located between a kitchen and a region of the restaurant configured to support a queue of patrons. This first instance of the food production station 102 can include a primary autonomous assembly zone 120 and a manual assembly zone 110 arranged atop the autonomous assembly zone 120 as described above. Additionally, the modular system 100 can include a second instance of the food production station 102 and a third instance of the food production station 102 stacked above the second instance of the food production station 102. The third instance of the food production station 102 can be configured to stack over (e.g., sit atop) the food prep surface 112 of the second instance of the food production station 102, thus forming a singular stacked food production station 102 including a lower autonomous assembly zone 120 and an upper autonomous assembly zone 120. In this example, the control program can be configured to selectively distribute orders received between each of the autonomous assembly zone 120s—including the primary autonomous assembly zone 120 and the lower and upper autonomous assembly zone 120s of the stacked food production station 102—to maximize efficiency (e.g., minimize wait time between receiving and delivering food orders), such as based on a quantity of food orders remaining in the order queue, quantity and type of ingredients required to complete food orders in the order queue, and/or quantity and type of ingredients remaining at each autonomous assembly zone 120.

The stacked food production station 102 can be configured to include a lower autonomous assembly zone 120 and an upper autonomous assembly zone 120 stacked atop the lower autonomous assembly zone 120, such that the upper autonomous assembly zone 120 rests on the food prep surface 112 of the second instance of the food production station 102.

In another implementation, a first instance of a food production station 102 can be configured to install orthogonally a second instance of a food production station 102. For example, a first instance of the food production station 102 can be located along a first wall within a kitchen of a restaurant. A second instance of the food production station 102 can be located along a second wall intersecting the first wall within the kitchen. The first and second instances of the food production station 102 can be configured to intersect proximal an intersection of the first and second walls. In this example, the first and second instances can include a transfer module configured to transfer food orders (e.g., by 90 degrees) and/or food containers from the first instance of the food production station 102 to the second instance of the food production station 102, such that these instances of the food production station 102 can be configured to assemble food orders in series.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
    during a first period of time, receiving a set of food orders for assembling units of a food product type at a food production station loaded with a set of ingredients and configured for:
        manual assembly of units of a food product type via a manual assembly zone of the food production station; and
        autonomous assembly of units of the food product type via an autonomous assembly zone of the food production station;
    based on characteristics of a first subset of food orders, in the set of food orders, distributing the first subset of food orders to the manual assembly zone by rendering prompts for ingredients in each food order, in the first subset of food orders, on a sequence of displays arranged within the manual assembly zone and above the autonomous assembly zone for manual preparation of units of the food product type according to the first subset of food orders; and
    based on characteristics of a second subset of food orders, in the set of food orders, distributing the second subset of food orders to the autonomous assembly zone by coordinating a sequence of food dispensing modules, in the autonomous assembly zone below the manual assembly zone, to dispense units of ingredients specified in each food order, in the second subset of food orders, for automatic assembly of units of the food product type according to the second subset of food orders.

2. The method of claim 1:
    wherein rendering prompts for ingredients in each food order, in the first subset of food orders, comprises rendering prompts for ingredients, in each food order, in the first subset of food orders, loaded in a sequence of food hoppers configured to store ingredients for manual preparation of units of the food product type; and
    wherein coordinating the sequence of food dispensing modules to dispense units of ingredients specified in each food order, in the second subset of food orders, comprises, coordinating the sequence of food dispensing modules, to dispense units of ingredients received from the sequence of food hoppers.

3. The method of claim 1, further comprising, during the first time period:
    tracking timeseries of amounts of ingredients, in the set of ingredients, stored within the food production station; and
    generating a set of food records based on timeseries of amounts of ingredients, each food record, in the set of food records, linked to a food order, in the set of food orders.

4. The method of claim 3, further comprising, during a setup period succeeding the first period of time and preceding a second period of time:
    estimating a set of predicted food orders for assembly during the second period of time based on the set of food records;
    calculating a set of prep amounts, each prep amount, in the set of prep amounts, corresponding to an ingredient, in the set of ingredients, based on the set of predicted food orders and the set of food records;
    generating a notification comprising a prompt to prepare the set of ingredients according to the set of prep amounts; and
    transmitting the notification to an operator associated with the food production station.

5. The method of claim 4:
    further comprising, calculating a first ingredient configuration for the first period of time based on the set of predicted food orders and the set of food records; and
    wherein generating the notification comprising the prompt to prepare the set of ingredients according to the set of prep amounts comprises generating the notification comprising the prompt to prepare the set of ingredients according to the set of prep amounts and the first ingredient configuration.

6. The method of claim 1:
    further comprising:
        for each food order, in the set of food orders, accessing a subset of ingredients, in the set of ingredients, specified by the food order; and
        for each ingredient, in the set of ingredients, accessing a remaining amount, in a set of remaining amounts, of the ingredient loaded on the food production station;
    wherein distributing the first subset of food orders to the manual assembly zone based on characteristics of food orders, in the first subset of food orders, comprises, in response to the first subset of food orders specifying a first subset of ingredients, in the set of ingredients, distributing the first subset of food orders to the manual assembly zone based on the first subset of ingredients and the set of remaining amounts; and
    wherein distributing the second subset of food orders to the autonomous assembly zone based on characteristics of food orders, in the second subset of food orders, comprises, in response to the second subset of food orders specifying a second subset of ingredients, in the set of ingredients, distributing the second subset of food orders to the autonomous assembly zone based on the second subset of ingredients and the set of remaining amounts.

7. The method of claim 1:
    further comprising, for each ingredient in the set of ingredients:
        tracking an ingredient duration for the ingredient;
        accessing a safety duration associated with the ingredient; and
        tracking a difference between the safety duration and the ingredient duration;
    wherein distributing the first subset of food orders to the manual assembly zone based on characteristics of food orders in the first subset of food orders comprises, in response to a first difference, corresponding to a first ingredient, falling below a threshold difference and in response to the first subset of food orders specifying a first subset of ingredients excluding the first ingredient, distributing the first subset of food orders to the manual assembly zone; and
    wherein distributing the second subset of food orders to the autonomous assembly zone based on characteristics of food orders in the second subset of food orders comprises, in response to the first difference falling below the threshold difference and in response to the second subset of food orders specifying a second subset of ingredients comprising the first ingredient, distributing the second subset of food orders to the autonomous assembly zone.

8. The method of claim 7, further comprising, in response to the first difference, corresponding to the first ingredient, falling below the threshold difference:
generating a prompt to empty a remainder of the first ingredient within the food production station and refill the first ingredient within the food production station; and
transmitting the prompt to an operator associated with the food production station.

9. A method comprising:
during a first period of time:
receiving a set of food orders, submitted by patrons, at a food production station configured for assembling units of a food product type according to the set of food orders; and
tracking a remaining amount of each ingredient, in the set of ingredients, stored within the food production station;
in response to receiving a first food order, in the set of food orders, at a first time within the first period of time:
recording a first received time value, in a set of received time values, corresponding to the first time; and
allocating the first food order for assembly in a manual assembly zone of the food production station configured for manual preparation of units of the food product type based on characteristics of the first food order;
during a first assembly period for the first food order:
estimating a first set of dispensed amounts corresponding to a first subset of ingredients, in the set of ingredients, manually dispensed by an operator, based on changes in amounts of ingredients, in the first subset of ingredients, stored within the food production station during the first assembly period; and
in response to termination of the first assembly period at a second time succeeding the first time:
recording a first complete time value, in a set of complete time values, corresponding to the second time; and
assembling a first food order record associated with the first food order and comprising the first received time value, the first set of dispensed amounts, and the first complete time value;
in response to receiving a second food order, in the set of food orders, at a second time within the first period of time:
recording a second received time value, in the set of received time values, corresponding to the second time; and
allocating the second food order for assembly in an autonomous assembly zone of the food production station configured for automatic preparation of units of the food product type based on characteristics of the second food order; and
during a second assembly period for the second unit of the food product type:
estimating a second set of dispensed amounts corresponding to a second subset of ingredients, in the set of ingredients, based on changes in amounts of ingredients, in the second subset of ingredients, stored within the food production station during the second assembly period; and
in response to termination of the second assembly period at a fourth time succeeding the third time:
recording a second complete time value, in the set of complete time values, corresponding to the fourth time; and
assembling a second food order record associated with the second food order and comprising the second received time value, the second set of dispensed amounts, and the second complete time value.

10. The method of claim 9:
wherein estimating the first set of dispensed amounts corresponding to the first subset of ingredients further comprises, in response to detecting manual dispensation of a first ingredient, in the first subset of ingredients, at a fifth time:
recording a fifth time value corresponding to the fifth time; and
estimating a first dispensed amount, in the first set of dispensed amounts, of the first ingredient dispensed at the fifth time; and
wherein estimating the second set of dispensed amounts corresponding to the second subset of ingredients further comprises, in response to dispensing a second ingredient, in the second subset of ingredients, at a sixth time:
recording a sixth time value corresponding to the sixth time; and
recording a second amount of the second ingredient dispensed at the sixth time.

11. The method of claim 9:
assembling a food production record for the first time period based on the first food order record and the second food order record;
for each ingredient, in the set of ingredients, estimating a first predicted amount, in a first set of predicted amounts, of the ingredient for dispensing during a second period of time succeeding the first period of time, based on the production record;
generating a notification indicating the first set of predicted amounts of ingredients for dispensation during the second period of time; and
at a fifth time, preceding the second period of time, transmitting the notification to a user associated with the food production station.

12. The method of claim 9, wherein allocating the first food order for assembly in the manual assembly zone of the food production station based on characteristics of the first food order comprises:
estimating a first target complete time for the first food order based on the first received time value and characteristics of the first food order;
accessing a food order queue comprising a subset of food orders, in the set of food orders, corresponding to received time values, in the set of received time values, preceding the first time;
predicting a manual complete time based on characteristics of the first food order and characteristics of the subset of food orders;
characterizing a first difference between the manual complete time and the first target complete time;

predicting an autonomous complete time based on characteristics of the first food order and characteristics of the subset of food orders;
characterizing a second difference between the autonomous complete time and the first target complete time; and
in response to the first difference falling below the second difference, allocating the first food order for assembly in the manual assembly zone.

13. A method comprising:
during a first period of time, receiving a set of food orders for assembling units of a food product type at a food production station loaded with a set of ingredients and configured for:
  manual assembly of units of a food product type via a manual assembly zone of the food production station; and
  autonomous assembly of units of the food product type via an autonomous assembly zone of the food production station;
distributing a first subset of food orders, in the set of food orders, to the manual assembly zone for manual preparation of units of the food product type, according to the first subset of food orders, based on characteristics of food orders, in the first subset of food orders;
distributing a second subset of food orders, in the set of food orders, to the autonomous assembly zone for automatic assembly of units of the food product type, according to the second subset of food orders, based on characteristics of food orders, in the second subset of food orders;
during the first time period, tracking a first timeseries of amounts of a first ingredient, in the set of ingredients, stored within the food production station; and
in response to detecting a first amount of the first ingredient loaded in the food production station at a first time:
  predicting an empty time for the first ingredient based on the first amount, the first time, and the set of food orders;
  scheduling a prep time for the first ingredient based on an average prep duration associated with the first ingredient and the empty time;
  generating a prompt to prep the first ingredient at the prep time; and
  rendering the prompt on a display arranged within the manual assembly zone; and
generating a set of food records based on timeseries of amounts of ingredients stored within the food production station, each food record, in the set of food records, linked to a food order in the set of food orders.

14. A method comprising:
during a first period of time, receiving a set of food orders for assembling units of a food product type at a food production station loaded with a set of ingredients and configured for:
  manual assembly of units of a food product type via a manual assembly zone of the food production station, the manual assembly zone comprising:
    a food prep surface located at a work surface height; and
    a receptacle configured to receive a sequence of food hoppers:
      transiently located adjacent and extending below the food prep surface; and
      configured to store ingredients for manual preparation of units of the food product type; and
  autonomous assembly of units of the food product type via an autonomous assembly zone of the food production station, the autonomous assembly zone comprising:
    a sequence of module housings:
      supporting the food prep surface; and
      configured to transiently house a sequence of food dispensing modules configured to dispense ingredients received from the sequence of food hoppers; and
    a conveyor:
      located adjacent the sequence of food dispensing modules; and
      configured to transport a food container along the sequence of food dispensing modules for dispensation of ingredients into the food container;
distributing a first subset of food orders, in the set of food orders, to the manual assembly zone for manual preparation of units of the food product type, according to the first subset of food orders, based on characteristics of food orders in the first subset of food orders; and
based on characteristics of food orders in a second subset of food orders, in the set of food orders, selectively triggering the sequence of food dispensing modules to dispense units of corresponding ingredients for automatic assembly of units of the food product type according to the second subset of food orders.

15. A method comprising:
during a first period of time, receiving a set of food orders for assembling units of a food product type at a food production station loaded with a set of ingredients and configured for:
  manual assembly of units of a food product type via a manual assembly zone of the food production station; and
  autonomous assembly of units of the food product type via an autonomous assembly zone of the food production station;
in response to a first subset of food orders, in the set of food orders, specifying on-site order type, in a set of order types, distributing the first subset of food orders to the manual assembly zone for manual preparation of units of the food product type according to the first subset of food orders; and
in response to a second subset of food orders, in the set of food orders, specifying an off-site order type, in the set of order types, distributing the second subset of food orders to the autonomous assembly zone for automatic assembly of units of the food product type according to the second subset of food orders.

16. A method comprising:
during a first period of time, receiving a set of food orders for assembling units of a food product type at a food production station loaded with a set of ingredients and configured for:
  manual assembly of units of a food product type via a manual assembly zone of the food production station; and
  autonomous assembly of units of the food product type via an autonomous assembly zone of the food production station;
in response to receipt of a first food order in the set of food orders:
  accessing a first set of characteristics of the first food order, the first set of characteristics comprising a first subset of ingredients, in the set of ingredients, specified by the first food order; and distributing the first food order to the manual assembly zone based on the first subset of ingredients; and in response to receipt of a second food order in the set of food orders:
accessing a second set of characteristics of the second food order, the second set of characteristics comprising a second subset of ingredients, in the set of ingredients, specified by the second food order; and
distributing the second food order to the autonomous assembly zone based on the second subset of ingredients.

17. The method of claim 16:
wherein distributing the first subset of food orders to the manual assembly zone for manual preparation comprises rendering prompts for ingredients in each food order, in the first subset of food orders, on a sequence of displays arranged within the manual assembly zone and above the autonomous assembly zone; and
wherein distributing the second subset of food orders to the autonomous assembly zone comprises coordinating a sequence of food dispensing modules, in the autonomous assembly zone below the manual assembly zone, to dispense units of ingredients specified in each food order, in the second subset of food orders.

18. The method of claim 15:
wherein receiving the first set of food orders comprises:
receiving a first food order, in the set of food orders, at a first time within the first period of time, the first food order defining the on-site order mode;
receiving a second food order, in the set of food orders, at a second time, succeeding the first time, within the first period of time, the second food order defining the off-site order mode; and
receiving a third food order, in the set of food orders, at a third time succeeding the second time, within the first period of time, the third food order defining the on-site order mode;
wherein distributing the first subset of food orders to the manual assembly zone in response to the first subset of food orders defining the on-site order mode further comprises:
at the first time, in response to the first food order defining the on-site order mode:
characterizing a first manual workload of the manual assembly zone at the first time; and
in response to the first manual workload falling below a threshold manual working, distributing the first food order to the manual assembly zone; and
at the third time, in response to the third food order defining the on-site order mode:
characterizing a second manual workload of the manual assembly zone at the third time; and
in response to the second manual workload exceeding the threshold manual workload, distributing the third food order to the autonomous assembly zone; and
wherein distributing the second subset of food orders to the autonomous assembly zone in response to the second subset of food orders defining the off-site order mode comprises, at the second time, in response to the second food order defining the off-site order mode:
characterizing a first autonomous workload of the autonomous assembly zone at the second time; and
in response to the first autonomous workload falling below a threshold autonomous workload, distributing the second food order to the autonomous assembly zone.

19. The method of claim 16:
further comprising, tracking an amount of each ingredient, in the set of ingredients, stored in the food production station;
wherein accessing the first set of characteristics of the first food order comprises accessing:
the first subset of ingredients; and
a first set of target ingredient amounts, each target ingredient amount, in the first set of target ingredient amounts, corresponding to an ingredient, in the first subset of ingredients;
wherein distributing the first food order to the manual assembly zone based on characteristics of the first food order comprises distributing the first food order to the manual assembly zone based on the first subset of ingredients, the first set of target ingredient amounts, and the amount of each ingredient, in the first subset of ingredients, stored in the food production station;
wherein accessing the second set of characteristics of the second food order comprises accessing:
the second set of ingredients; and
a second set of target ingredient amounts, each target ingredient amount, in the second set of target ingredient amounts, corresponding to an ingredient, in the second subset of ingredients; and
wherein distributing the second food order to the autonomous assembly zone based on characteristics of the second food order comprises distributing the second food order to the autonomous assembly zone based on the second subset of ingredients, the second set of target ingredient amounts, and the amount of each ingredient, in the second subset of ingredients, stored in the food production station.

20. The method of claim 16:
wherein accessing the first set of characteristics in response to receiving the first food order comprises accessing the first set of characteristics in response to receiving the first food order at a first time within the first period of time;
wherein accessing the second set of characteristics in response to receiving the second food order comprises accessing the second set of characteristics in response to receiving the second food order at a second time within the first period of time; and
further comprising:
during the first period, tracking an amount of each ingredient, in the set of ingredients, stored in the food production station;
in response to receiving the first food order:
recording a first timestamp corresponding to the first time;
during the first assembly period, estimating a first set of dispensed amounts, corresponding to the first subset of ingredients, based on changes in amounts of ingredients, in the first subset of ingredients, manually dispensed by an operator during the first assembly period; and
in response to termination of the first assembly period at a third time succeeding the first time, recording a third time value corresponding to the third time; and in response to receiving the second food order:
  recording a second timestamp corresponding to the second time;
  during the second assembly period, estimating a second set of dispensed amounts, corresponding to the second subset of ingredients, based on changes in amounts of ingredients, in the second subset of ingredients, dispensed during the second assembly period; and
  in response to termination of the second assembly period at a fourth time succeeding the second time, recording a fourth time value corresponding to the second time.

* * * * *